United States Patent
Sun et al.

(10) Patent No.: US 10,506,629 B2
(45) Date of Patent: Dec. 10, 2019

(54) BEAM REFINEMENT REFERENCE SIGNAL ENHANCEMENT FOR HIGHER MOBILITY SUPPORT

(71) Applicant: QUALCOMM Incorporated, San Diego, CA (US)

(72) Inventors: Jing Sun, San Diego, CA (US); Tamer Kadous, San Diego, CA (US); Juan Montojo, San Diego, CA (US); Peter Pui Lok Ang, San Diego, CA (US); Xiaoxia Zhang, San Diego, CA (US); Taesang Yoo, San Diego, CA (US); Ahmed Kamel Sadek, San Diego, CA (US); Sanaz Barghi, Carlsbad, CA (US); Akula Reddy, San Diego, CA (US); Andrei Dragos Radulescu, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/801,150

(22) Filed: Nov. 1, 2017

(65) Prior Publication Data

US 2018/0124820 A1    May 3, 2018

Related U.S. Application Data

(60) Provisional application No. 62/416,316, filed on Nov. 2, 2016.

(51) Int. Cl.
*H04W 72/14*   (2009.01)
*H04L 5/00*    (2006.01)
(Continued)

(52) U.S. Cl.
CPC .......... *H04W 72/14* (2013.01); *H04B 7/0695* (2013.01); *H04B 7/088* (2013.01);
(Continued)

(58) Field of Classification Search
CPC ............... H04W 72/14; H04W 72/044; H04W 72/0413; H04W 72/08; H04W 88/08;
(Continued)

(56) References Cited

U.S. PATENT DOCUMENTS

2010/0215027 A1  8/2010  Liu et al.
2015/0244071 A1  8/2015  Shirakata et al.
2016/0353424 A1*  12/2016  Stirling-Gallacher ......................
                                          H04B 7/0626

FOREIGN PATENT DOCUMENTS

EP         2897304 A1    7/2015

OTHER PUBLICATIONS

Partial International Search Report—PCT/US2017/059742—ISA/EPO—dated Apr. 5, 2018.
(Continued)

*Primary Examiner* — Wayne H Cai
(74) *Attorney, Agent, or Firm* — Holland & Hart LLP

(57) ABSTRACT

Methods, systems, and devices for wireless communication are described. A base station may transmit, using a first base station beam, a first message to a user equipment (UE). The first message may include a pre-grant communication and a plurality of downlink beam refinement reference signals (D-BRRSs). The base station may receive a second message from the UE in response to the first message. The second message may include a pre-grant acknowledgement and a plurality of uplink beam refinement reference signals (U-BRRSs). The base station may transmit, using a second
(Continued)

base station beam, a third message to the UE. A width of the second base station beam may be less than a width of the first base station beam.

27 Claims, 18 Drawing Sheets

(51) Int. Cl.
| | |
|---|---|
| *H04W 8/08* | (2009.01) |
| *H04W 72/04* | (2009.01) |
| *H04W 74/08* | (2009.01) |
| *H04B 7/06* | (2006.01) |
| *H04B 7/08* | (2006.01) |
| *H04W 88/02* | (2009.01) |
| *H04W 88/08* | (2009.01) |

(52) U.S. Cl.
CPC ............ *H04L 5/001* (2013.01); *H04L 5/0048* (2013.01); *H04W 8/08* (2013.01); *H04W 72/044* (2013.01); *H04W 72/0413* (2013.01); *H04W 74/08* (2013.01); *H04W 74/0816* (2013.01); *H04W 88/02* (2013.01); *H04W 88/08* (2013.01)

(58) Field of Classification Search
CPC ....... H04W 74/08; H04W 8/08; H04W 88/02; H04W 74/0816; H04L 5/0048; H04L 5/001; H04B 7/0695; H04B 7/088
See application file for complete search history.

(56) References Cited

OTHER PUBLICATIONS

International Search Report and Written Opinion—PCT/US2017/059742—ISA/EPO—dated Jun. 6, 2018.

* cited by examiner

BEAM REFINEMENT REFERENCE SIGNAL ENHANCEMENT FOR HIGHER MOBILITY SUPPORT

CROSS REFERENCES

The present application for patent claims priority to U.S. Provisional Patent Application No. 62/416,316 by Sun, et al., entitled "Beam Refinement Reference Signal Enhancement For Higher Mobility Support," filed Nov. 2, 2016, assigned to the assignee hereof.

BACKGROUND

The following relates generally to wireless communication, and more specifically to beam refinement reference signal enhancement for higher mobility support.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Wireless communication systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed.

Wireless communications between two wireless nodes, e.g., between a base station and a UE, may use beams or beamformed signals for transmission and/or reception. A beam used for such wireless communications may be referred to as an active beam, a best beam, or a serving beam. The active beam may initially be picked from a reference beam and then refined over time. For example, due to changing communication conditions, movement of a UE, etc., an active beam may be refined according to a periodic schedule and/or as needed. Thus, a UE active beam or a base station active beam may be refined. Conventional refinement techniques may include transmission of beam refinement reference signals (BRRSs) where the candidate beams are typically adjacent to the active beams. Such techniques, however, assumes that there is sufficient overlap between the candidate beams and the active beams. While this may support low mobility UEs, UEs associated with a higher mobility state may not be able to detect the candidate beam signaling and therefore drop communications with the base station.

SUMMARY

The described techniques relate to improved methods, systems, devices, or apparatuses that support beam refinement reference signal enhancement for higher mobility support. Broadly, the described techniques provide for use of a wider beam during a beam refinement reference signal (BRRS) procedure between the base station and the user equipment (UE) and between the UE and the base station. For example, a base station may select a beam width for a message, e.g., a pre-grant (PG) transmission and one or more downlink BRRS (D-BRRS) transmissions. The selected beam may have a configuration that is a function of the active beam and ensures detectability by the UE. The beam configuration may include a wider beam width and/or a beam direction that accounts for UE mobility. The UE may receive the message and use the D-BRRS transmissions to select a new active beam for the UE. The UE may use the new active beam for transmission of a message, e.g., a pre-grant acknowledgement (PGA) transmission and one or more uplink BRRS (U-BRRS) transmissions. The base station may receive the PGA transmission using a wider width base station beam and then use the U-BRRS transmission(s) to select a new active beam for the base station. In some aspects, the U-BRRS transmissions in the second message may precede transmission of the PGA transmission.

A method of wireless communication is described. The method may include transmitting, using a first base station beam, a first message to a UE, the first message comprising a pre-grant communication and a plurality of downlink beam refinement reference signals, receiving a second message from the UE in response to the first message, the second message comprising a pre-grant acknowledgment and a plurality of uplink beam refinement reference signals, and transmitting, using a second base station beam, a third message to the UE, wherein a width of the second base station beam is less than a width of the first base station beam.

An apparatus for wireless communication is described. The apparatus may include means for transmitting, using a first base station beam, a first message to a UE, the first message comprising a pre-grant communication and a plurality of downlink beam refinement reference signals, means for receiving a second message from the UE in response to the first message, the second message comprising a pre-grant acknowledgment and a plurality of uplink beam refinement reference signals, and means for transmitting, using a second base station beam, a third message to the UE, wherein a width of the second base station beam is less than a width of the first base station beam.

Another apparatus for wireless communication is described. The apparatus may include a processor, memory in electronic communication with the processor, and instructions stored in the memory. The instructions may be operable to cause the processor to transmit, using a first base station beam, a first message to a UE, the first message comprising a pre-grant communication and a plurality of downlink beam refinement reference signals, receive a second message from the UE in response to the first message, the second message comprising a pre-grant acknowledgment and a plurality of uplink beam refinement reference signals, and transmit, using a second base station beam, a third message to the UE, wherein a width of the second base station beam is less than a width of the first base station beam.

A non-transitory computer readable medium for wireless communication is described. The non-transitory computer-readable medium may include instructions operable to cause a processor to transmit, using a first base station beam, a first message to a UE, the first message comprising a pre-grant communication and a plurality of downlink beam refinement reference signals, receive a second message from the UE in response to the first message, the second message comprising a pre-grant acknowledgment and a plurality of uplink beam refinement reference signals, and transmit, using a second base station beam, a third message to the UE, wherein a width of the second base station beam is less than a width of the first base station beam.

Some examples of the method, apparatus, and non-transitory computer-readable medium described above may further include processes, features, means, or instructions for determining a mobility parameter associated with the UE, wherein the width of the first base station beam may be based at least in part on the mobility parameter.

In some examples of the method, apparatus, and non-transitory computer-readable medium described above, the mobility parameter comprises one or more of a current mobility parameter, a historical mobility parameter, a speed parameter, a direction parameter, a location parameter, and a recent beamformed signal direction parameter.

Some examples of the method, apparatus, and non-transitory computer-readable medium described above may further include processes, features, means, or instructions for selecting the second base station beam based at least in part on the plurality of uplink beam refinement reference signals.

In some examples of the method, apparatus, and non-transitory computer-readable medium described above, the plurality of uplink beam refinement reference signals precede in time the pre-grant acknowledgement of the second message.

Some examples of the method, apparatus, and non-transitory computer-readable medium described above may further include processes, features, means, or instructions for transmitting a first channel reservation message in conjunction with the first message using the first base station beam.

Some examples of the method, apparatus, and non-transitory computer-readable medium described above may further include processes, features, means, or instructions for transmitting a second channel reservation message in conjunction with the third message using the second base station beam.

In some examples of the method, apparatus, and non-transitory computer-readable medium described above, the first channel reservation message and the second channel reservation message reserve a channel of a shared radio frequency spectrum band for a same listen-before-talk (LBT) frame.

In some examples of the method, apparatus, and non-transitory computer-readable medium described above, the first channel reservation message reserves a channel of a shared radio frequency spectrum band up to a time that the second channel reservation message may be transmitted, and wherein the second channel reservation message reserves the channel until at least an end of the LBT frame.

In some examples of the method, apparatus, and non-transitory computer-readable medium described above, the third message comprises an uplink or a downlink grant.

A method of wireless communication is described. The method may include receiving, using a first UE beam, a first message from a base station, the first message comprising a pre-grant communication and a plurality of downlink beam refinement reference signals, selecting a second UE beam based at least in part on the plurality of downlink beam refinement reference signals, transmitting, using the second UE beam, a second message to the base station in response to the first message, the second message comprising a pre-grant acknowledgment and a plurality of uplink beam refinement reference signals, and receiving a third message from the base station using the second UE beam, wherein a width of the second UE beam is smaller than a width of the first UE beam.

An apparatus for wireless communication is described. The apparatus may include means for receiving, using a first UE beam, a first message from a base station, the first message comprising a pre-grant communication and a plurality of downlink beam refinement reference signals, means for selecting a second UE beam based at least in part on the plurality of downlink beam refinement reference signals, means for transmitting, using the second UE beam, a second message to the base station in response to the first message, the second message comprising a pre-grant acknowledgment and a plurality of uplink beam refinement reference signals, and means for receiving a third message from the base station using the second UE beam, wherein a width of the second UE beam is smaller than a width of the first UE beam.

Another apparatus for wireless communication is described. The apparatus may include a processor, memory in electronic communication with the processor, and instructions stored in the memory. The instructions may be operable to cause the processor to receive, using a first UE beam, a first message from a base station, the first message comprising a pre-grant communication and a plurality of downlink beam refinement reference signals, select a second UE beam based at least in part on the plurality of downlink beam refinement reference signals, transmit, using the second UE beam, a second message to the base station in response to the first message, the second message comprising a pre-grant acknowledgment and a plurality of uplink beam refinement reference signals, and receive a third message from the base station using the second UE beam, wherein a width of the second UE beam is smaller than a width of the first UE beam.

A non-transitory computer readable medium for wireless communication is described. The non-transitory computer-readable medium may include instructions operable to cause a processor to receive, using a first UE beam, a first message from a base station, the first message comprising a pre-grant communication and a plurality of downlink beam refinement reference signals, select a second UE beam based at least in part on the plurality of downlink beam refinement reference signals, transmit, using the second UE beam, a second message to the base station in response to the first message, the second message comprising a pre-grant acknowledgment and a plurality of uplink beam refinement reference signals, and receive a third message from the base station using the second UE beam, wherein a width of the second UE beam is smaller than a width of the first UE beam.

In some examples of the method, apparatus, and non-transitory computer-readable medium described above, the plurality of uplink beam refinement reference signals precede in time the pre-grant acknowledgement.

Some examples of the method, apparatus, and non-transitory computer-readable medium described above may further include processes, features, means, or instructions for transmitting a channel reservation message in conjunction with the second message using the first UE beam.

Some examples of the method, apparatus, and non-transitory computer-readable medium described above may further include processes, features, means, or instructions for determining a mobility parameter associated with the UE, wherein the width of the first UE beam may be based at least in part on the mobility parameter.

In some examples of the method, apparatus, and non-transitory computer-readable medium described above, the mobility parameter comprises one or more of a current mobility parameter, a historical mobility parameter, a speed parameter, a direction parameter, a location parameter, and a recent beamformed signal direction parameter.

A method of wireless communication is described. The method may include receiving, using a first UE beam, a first message from a base station, the first message comprising a pre-grant communication and a plurality of downlink beam refinement reference signals, selecting a second UE beam based at least in part on the plurality of downlink beam refinement reference signals, transmitting, using the second UE beam, a second message to the base station in response to the first message, the second message comprising a pre-grant acknowledgment and a plurality of uplink beam refinement reference signals, wherein the plurality of uplink bean refinement reference signals precede the pre-grant acknowledgment in time, and receiving a third message from the base station using the second UE beam.

An apparatus for wireless communication is described. The apparatus may include means for receiving, using a first UE beam, a first message from a base station, the first message comprising a pre-grant communication and a plurality of downlink beam refinement reference signals, means for selecting a second UE beam based at least in part on the plurality of downlink beam refinement reference signals, means for transmitting, using the second UE beam, a second message to the base station in response to the first message, the second message comprising a pre-grant acknowledgment and a plurality of uplink beam refinement reference signals, wherein the plurality of uplink bean refinement reference signals precede the pre-grant acknowledgment in time, and means for receiving a third message from the base station using the second UE beam.

Another apparatus for wireless communication is described. The apparatus may include a processor, memory in electronic communication with the processor, and instructions stored in the memory. The instructions may be operable to cause the processor to receive, using a first UE beam, a first message from a base station, the first message comprising a pre-grant communication and a plurality of downlink beam refinement reference signals, select a second UE beam based at least in part on the plurality of downlink beam refinement reference signals, transmit, using the second UE beam, a second message to the base station in response to the first message, the second message comprising a pre-grant acknowledgment and a plurality of uplink beam refinement reference signals, wherein the plurality of uplink bean refinement reference signals precede the pre-grant acknowledgment in time, and receive a third message from the base station using the second UE beam.

A non-transitory computer readable medium for wireless communication is described. The non-transitory computer-readable medium may include instructions operable to cause a processor to receive, using a first UE beam, a first message from a base station, the first message comprising a pre-grant communication and a plurality of downlink beam refinement reference signals, select a second UE beam based at least in part on the plurality of downlink beam refinement reference signals, transmit, using the second UE beam, a second message to the base station in response to the first message, the second message comprising a pre-grant acknowledgment and a plurality of uplink beam refinement reference signals, wherein the plurality of uplink bean refinement reference signals precede the pre-grant acknowledgment in time, and receive a third message from the base station using the second UE beam.

Some examples of the method, apparatus, and non-transitory computer-readable medium described above may further include processes, features, means, or instructions for transmitting a channel reservation message in conjunction with the second message using the second UE beam.

In some examples of the method, apparatus, and non-transitory computer-readable medium described above, a width of the second UE beam may be smaller than a width of the first UE beam.

Some examples of the method, apparatus, and non-transitory computer-readable medium described above may further include processes, features, means, or instructions for determining a mobility parameter associated with the UE, wherein the width of the first UE beam may be based at least in part on the mobility parameter.

In some examples of the method, apparatus, and non-transitory computer-readable medium described above, the mobility parameter comprises one or more of a current mobility parameter, a historical mobility parameter, a speed parameter, a direction parameter, a location parameter, and a recent beamformed signal direction parameter.

DETAILED DESCRIPTION

Figure 1:
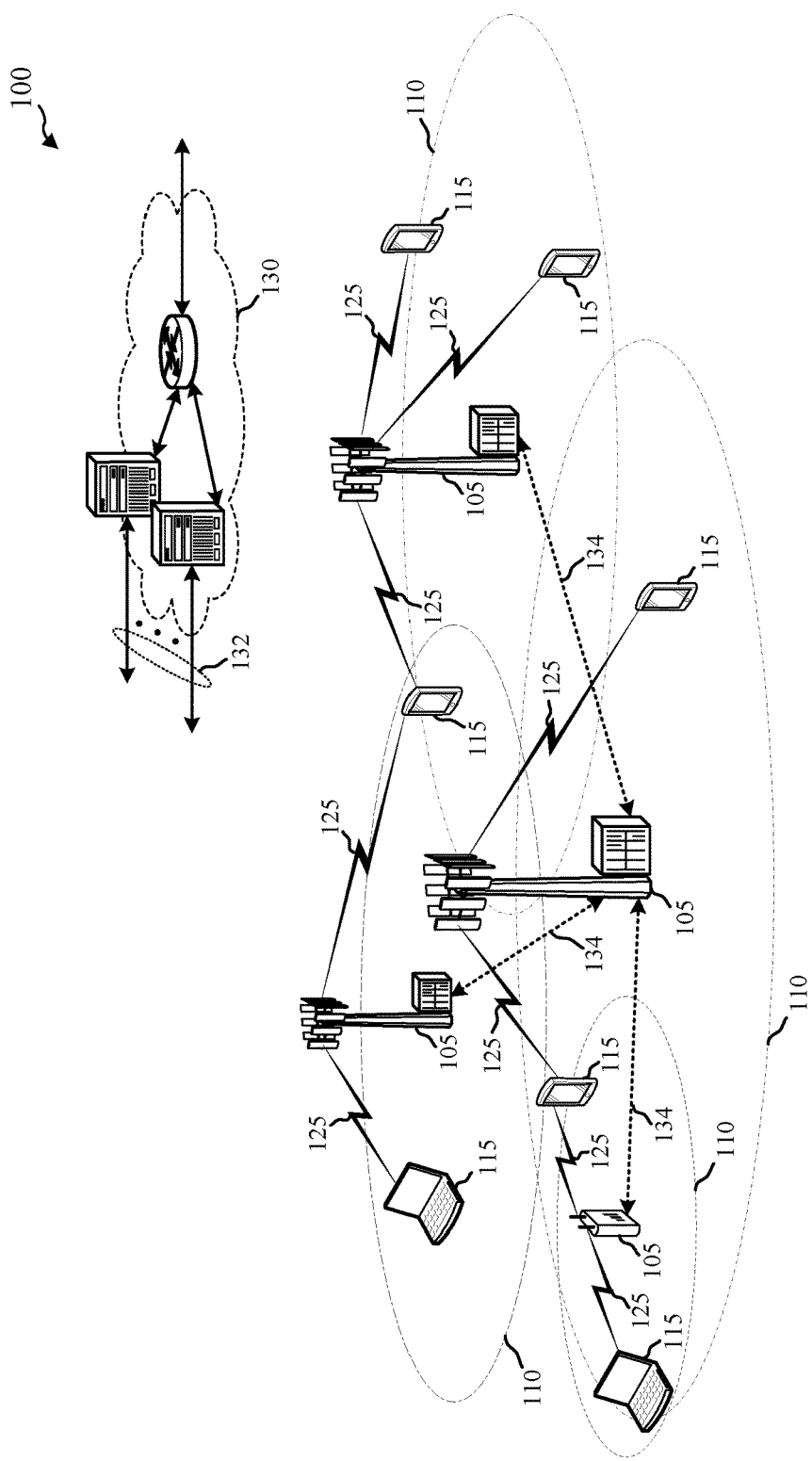
FIG. 1 illustrates an example of a system for wireless communication that supports beam refinement reference signal enhancement for higher mobility support in accordance with aspects of the present disclosure.

Wireless communications between two wireless nodes, e.g., a base station and a user equipment (UE), may include beamformed transmissions on an active beam. A beam may refer to an antenna configuration used by a node that supports transmission of a signal and/or reception of a signal in a directional manner. Generally, the beam may have associated beam properties, such as a beam width, a beam shape, a beam direction, and the like. The active beam in this context may be defined as a BS-UE beam pair that is currently being used for the wireless communications. Candidate beams may be other beams that may be transmitted from the base station and may have a different shape and/or be oriented in different directions. Such candidate beams may also be used for communications, e.g., selected as a new active beam when conditions are appropriate. The candidate beams may be shortlisted using a measurement report of a reference signal, such as an earlier beam reference signal (BRS) and/or a beam refinement reference signal (BRRS). The candidate beams may also be selected for having properties similar to the active beam, e.g., in terms of the transmission direction from the base station. Thus, refinement of the active beam may refer to updating one or more beam properties of the active beam (e.g., beam direction, beam width, beam shape, etc.) to provide optimal coverage and communication between the wireless nodes.

Aspects of the disclosure are initially described in the context of a wireless communication system, such as a millimeter wave (mmW) wireless communication system. The described techniques enable a base station and a UE to support high UE mobility during a beam refinement procedure. For example, the base station may use a first base station beam to transmit a first message to the UE. The first message may include a pre-grant (PG) communication and downlink BRRSs (D-BRRSs). The UE may receive the first message using a first UE beam and use the D-BRRSs to select a second UE beam. The UE may transmit and the base station may receive a second message in response to the first message. The second message may include a pre-grant acknowledgement (PGA) and uplink BRRSs (U-BRRSs). The base station may receive the PGA using the first base station beam and use the U-BRRSs to select a second base station beam. The base station may use a second base station beam to transmit a third message to the UE (e.g., a grant message). Generally, the first UE beam may be a wider beam than the second UE beam. Correspondingly, the first base station beam may be wider than second base station beam. The wider beam widths may support mobility of the UE and ensure receipt of the PG and the PGA transmissions.

In some aspects, the UE may use the first UE beam to receive the first message from the base station. The UE may use the D-BRRSs to select a second UE beam. The UE may use the second UE beam to transmit a second message to the base station. In some aspects, the PGA communication may follow transmission of the U-BRRSs in the second message. In other aspects, the U-BRRSs in the second messages may follow the PGA transmission. The UE may receive a third message from the base station (e.g., a message conveying the grant).

Aspects of the disclosure are further illustrated by and described with reference to apparatus diagrams, system diagrams, and flowcharts that relate to beam refinement reference signal enhancement for higher mobility support.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) (or LTE-Advanced) network, or a New Radio (NR) network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one Mobility Management Entity (MME), at least one Serving Gateway (S-GW), and at least one Packet Gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, IP connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although in some cases WLAN networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support mmW communications between UEs 115 and base stations 105. Devices operating in mmW or EHF bands may have multiple antennas to allow beamforming. That is, a base station 105 and/or a UE 115 may use multiple antennas or antenna arrays to conduct beamforming operations for directional communications. Beamforming (which may also be referred to as spatial filtering or directional transmission) is a signal processing technique that may be used at a transmitter (e.g. a base station 105 and/or a UE 115) to shape and/or steer an overall antenna beam in the direction of a target receiver (e.g. a UE 115 and/or a base station 105). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g. a base station 105) and a receiver (e.g. a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operates according to a layered protocol stack. In the user plane, communications at the bearer or Packet Data Convergence Protocol (PDCP)

layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid Automatic Repeat Request (HARM) to provide retransmission at the MAC layer to improve link efficiency. In the control plane, the Radio Resource Control (RRC) protocol layer may provide establishment, configuration, and maintenance of an RRC connection between a UE 115 and a base station 105, or core network 130 supporting radio bearers for user plane data. At the Physical (PHY) layer, transport channels may be mapped to physical channels.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

In some cases, a base station 105 may be configured to support one or more aspects of the described techniques for beam refinement reference signal enhancement for higher mobility support. The base station 105 may use a first base station beam to transmit a first message to a UE 115. The first message may include a PG communication and a plurality of D-BRRSs. The base station 105 may receive a second message from the UE 115 in response to the first message. The second message may include a PGA and a plurality of U-BRRSs. The base station 105 may use a second base station beam to transmit a third message to the UE 115. The width of the second base station beam may be less than a width of the first base station beam.

In some cases, a UE 115 may use a first UE beam to receive the first message from the base station 105. The first message may include the PG communication and the plurality of D-BRRSs. The UE 115 may use the D-BRRSs to select a second UE beam. The UE 115 may use the second UE beam to transmit the second message to the base station 105. The second message may include the PGA and the plurality of U-BRRSs. The UE 115 may receive the third message from the base station 105 using the second UE beam. The width of the second UE beam may be less than the width of the first UE beam.

In some cases, a UE 115 may use a first UE beam to receive the first message from the base station 105. The first message may include the PG communication and the plurality of D-BRRSs. The UE 115 may use the D-BRRSs to select a second UE beam. The UE 115 may use the second UE beam to transmit the second message to the base station 105. The second message may include the PGA and the plurality of U-BRRSs. However, the U-BRRSs may precede in time the PGA. The UE 115 may receive the third message from the base station 105 using the second UE beam.

Figure 2:
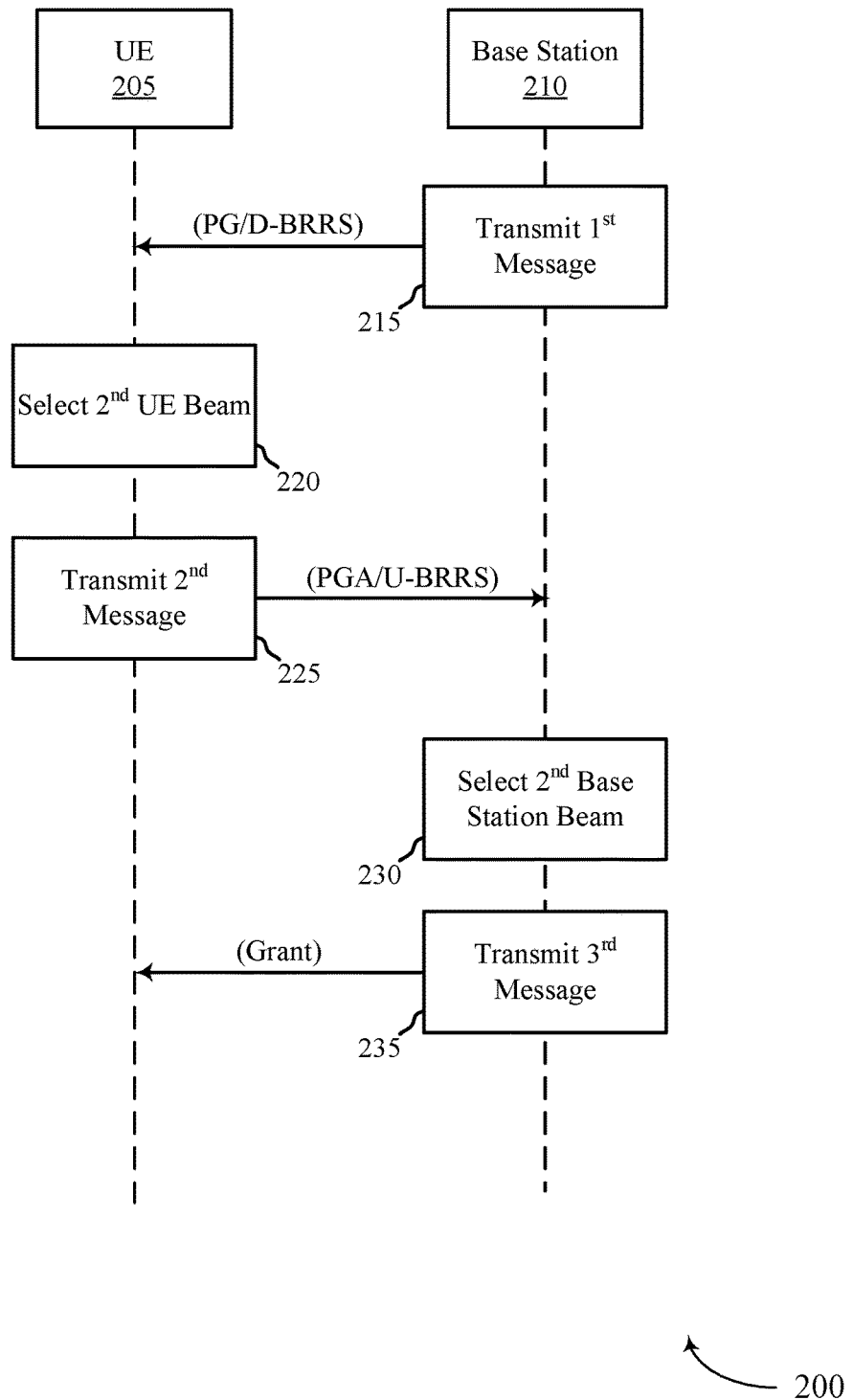
FIG. 2 illustrates an example of a process flow that supports beam refinement reference signal enhancement for higher mobility support in accordance with aspects of the present disclosure.

FIG. 2 illustrates an example of a process flow 200 for beam refinement reference signal enhancement for higher mobility support. Process flow 200 may implement aspects of wireless communication system 100 of FIG. 1. Process flow 200 may include a UE 205 and a base station 210, which may be examples of the corresponding devices described herein. Base station 210 may be a mmW base station and a serving base station for UE 205. Base station 210 and UE 205 may be in communication using an active beam, which may be referred to as beam N.

At 215, base station 210 may transmit the first message to UE 205. Base station 210 may use a first base station beam to transmit the first message. The first message may include a PG communication and a plurality of D-BRRSs. Generally, the first base station beam may be associated with a transmit antenna configuration used for transmission of the first message in a particular direction and having a beam width and/or beam shape. The first base station beam may have an associated width (e.g., beam width) that may be a function of the active beam. The first base station beam may be referred to as N'. The first base station beam may be considered a parent of the active beam and may cover the active beam, in some aspects. Thus, in the example where UE 205 has high mobility and moves out of the coverage area of the active beam, the first base station beam may still cover the UE 205. Although the first base station beam may be associated with a reduced antenna gain attributable to the increased beam width, the downlink budget for base station 210 may be sufficient to offset the reduced antenna gain.

In some aspects, the width of the first base station beam may be based on a mobility parameter of the UE 205. Examples of the mobility parameters may include, but are not limited to, one or more of a current and/or historical mobility parameters, speed parameters, a direction parameter, a location parameter, a recent beamformed signal direction parameter, and the like. For example, base station 210 may monitor and/or receive information indicative of the current and/or previous location/speed/direction parameters of UE 205 over a predetermined time. Based on this information, base station 210 may select a width of the first base station beam to ensure that the UE 205 will receive the first message. Base station 210 may receive this information from UE 205 and/or from a network entity, such as a MME.

In some aspects, the base station 210 may transmit a first channel reservation (CR) message in conjunction with transmission of the first message. Generally the first CR message may reserve the channel for a time period. For example, the first CR message may reserve the channel of a shared radio frequency spectrum band for a LBT frame duration. In some examples, the first CR message may reserve the channel of the shared radio frequency spectrum band up to a time when a second CR message is transmitted (discussed below).

At 220, UE 205 may receive the first message from base station 210 using a first UE beam and use the plurality of D-BRRSs to select a second UE beam. Generally, the first UE beam may be associated with a receive antenna configuration used for reception of the first message in a particular direction and covering a particular beam width and/or beam shape. In some aspects, the UE 205 may use the first UE beam to receive the PG communication. Using the first UE beam to receive the PG communication may ensure that the PG communication is received by UE 205 while in a high mobility state. UE 205 may then use a variety of different UE receive beam configurations to determine an updated active beam for the UE 205. For example, UE 205 may use different UE side receive antenna configurations to determine which D-BRRS is optimally received, e.g., received with the highest received power level, with the lowest interference level, with the highest supported throughput rate, and the like. This second UE beam may be considered the new active beam from the UE perspective and may be used for future transmissions and/or receptions.

In some aspects, the width of the first UE beam may be based on a mobility parameter of the UE 205. Examples of the mobility parameters may include, but are not limited to, one or more of a current and/or historical mobility parameters, speed parameters, a direction parameter, a location parameter, a recent beamformed signal direction parameter, and the like. For example, UE 205 may monitor and/or store information indicative of the current and/or previous location/speed/direction parameters of UE 205 over a predetermined time. Based on this information, UE 205 may select a width of the first UE beam to ensure that the UE 205 will receive the first message from base station 210.

In some aspects, the first UE beam may have a beam width that is wider than the beam width of the second UE beam, e.g., the second UE beam may have a width that is less than the first UE beam. The wider beam width of the first UE beam may support reception of the first message from the base station 210 in the situation where UE 205 is in a high mobility state.

At 225, UE 205 may use the second UE beam to transmit the second message to base station 210. The second message may include a PGA communication and a plurality of U-BRRSs. In some aspects, the PGA communication may precede in time the plurality of U-BRRSs. In some aspects, the plurality of U-BRRSs may precede in time the PGA communication. In some aspects, UE 205 may transmit a CR message in conjunction with the second message. The CR message may be transmitted using the first UE beam.

At 230, base station 210 may receive the second message from the UE 205 and use the plurality of U-BRRSs to select a second base station beam. For example, the base station 210 may receive the PGA communication using a wide width beam receive antenna configuration (e.g., a receive antenna configuration corresponding to the first base station beam). The base station 210 may then use a plurality of different receive antenna configurations to determine which U-BRRS is optimally received, e.g., received with the highest receive power, received with the lowest interference level, etc. The receive antenna configuration associated with receipt of the optimal U-BRRS beam may be identified as the second base station beam.

In some aspects, the first base station beam may have a beam width that is wider than the beam width of the second base station beam, e.g., the second base station beam may have a width that is less than the first base station beam. The wider beam width of the first base station beam may support reception of the second message from the UE 205 in the situation where UE 205 is in a high mobility state.

At 235, base station 210 may transmit the third message to UE 205. Base station 210 may transmit the third message using the second base station beam. The third message may be a grant message (e.g., convey an indication of an uplink grant or a downlink grant). As discussed, the width of the second base station beam may be less than the width of the first base station beam. In some aspects, the third message may be transmitted in conjunction with a CR message (e.g., a second CR message).

In some aspects, the first and second CR messages reserve the channel for a LBT frame. In some aspects, the first CR message reserves the channel up to a time when the second CR message is transmitted. In that instance, the second CR message may reserve the channel until the end of the LBT frame.

Figure 3:
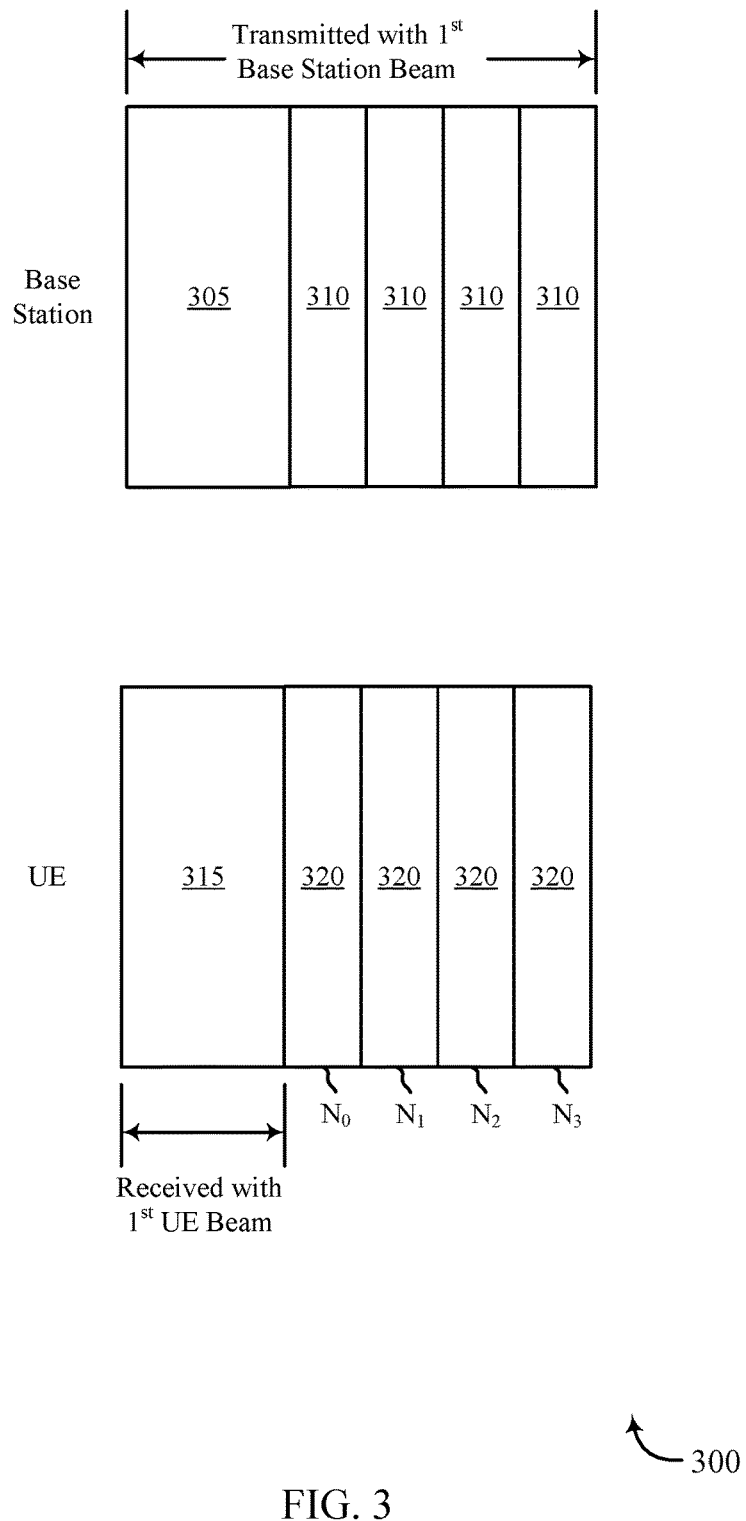
FIG. 3 illustrates an example of a beam refinement transmission scheme that supports beam refinement reference signal enhancement for higher mobility support in accordance with aspects of the present disclosure.

FIG. 3 illustrates an example of a beam refinement transmission scheme 300 for beam refinement reference signal enhancement for higher mobility support. Transmission scheme 300 may implement one or more aspects of wireless communication system 100 of FIG. 1. Transmission scheme 300 may implement one or more aspects of process flow 200 of FIG. 2. In some aspects, a base station and/or a UE may be configured to support aspects of transmission scheme 300. Transmission scheme 300 may be an example of a D-BRRS procedure performed between the base station and the UE.

Generally, transmission scheme 300 may include a base station transmitting a first message that includes a PG communication 305 and a plurality of D-BRRSs 310. The first message may be transmitted using the first base station beam, as discussed with reference to process flow 200 of FIG. 2. Thus, the base station may transmit the first message using a wide beam width signal that ensures detection of the PG by the UE during a high mobility state (and a low mobility state). The base station may also transmit a CR message in conjunction with transmission of the first message, e.g., during the PG communication 305.

A UE may receive the first message using the first UE beam. For example, the UE may receive the PG communication 315 using the first UE beam. As discussed above, the first UE beam may be associated with a receive antenna configuration that has a wide beam width. This may also support receipt of the first message during a high mobility state.

The UE may then use a plurality of different receive antenna configurations 320 to receive the D-BRRSs 310. For example, the UE may use a first receive antenna configuration $N_0$ to receive the first D-BRRS 310, a second receive antenna configuration $N_1$ to receive a second D-BRRS 310, and so on. Based on the results of the different receive antenna configurations, the UE may select the second UE beam as the new active beam for communications with the base station.

Figure 4:
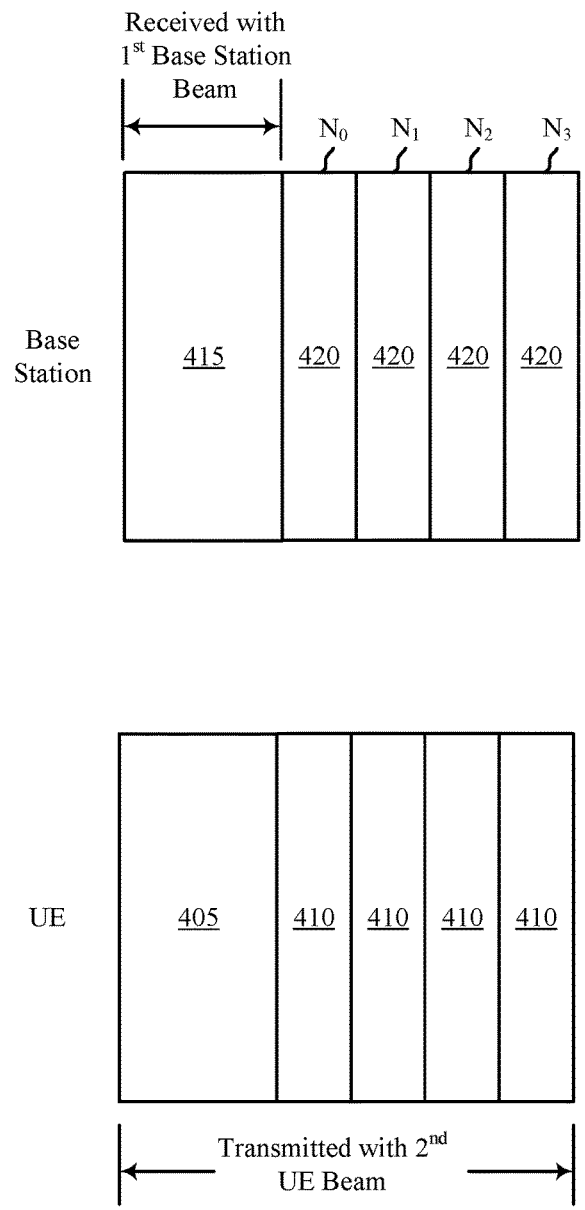
FIG. 4 illustrates an example of a beam refinement transmission scheme that supports beam refinement reference signal enhancement for higher mobility support in accordance with aspects of the present disclosure.

FIG. 4 illustrates an example of a beam refinement transmission scheme 400 for beam refinement reference signal enhancement for higher mobility support. Transmission scheme 400 may implement one or more aspects of wireless communication system 100 of FIG. 1. Transmission scheme 400 may implement one or more aspects of process flow 200 of FIG. 2. In some aspects, a base station and/or a UE may be configured to support aspects of transmission scheme 400. Transmission scheme 400 may be an example of an U-BRRS procedure performed between the UE and the base station.

Generally, transmission scheme 400 may include a UE transmitting a second message that includes a PGA communication 405 and a plurality of U-BRRSs 410. The second message may be transmitted using the second UE beam, as discussed with reference to transmission scheme 300 of FIG. 3. Thus, the UE may transmit the second message using an updated active beam that ensures detection of the PGA by the base station. The UE may also transmit a CR message in conjunction with transmission of the second message, e.g., during the PGA communication 405.

A base station may receive the second message using the first base station beam. For example, the base station may receive the PGA communication 415 using the first base station beam. As discussed above, the first base station beam may be associated with a receive antenna configuration that has a wide beam width. This may also support receipt of the second message during a high mobility state of the UE.

The base station may then use a plurality of different receive antenna configurations 420 to receive the U-BRRSs 410. For example, the base station may use a first receive antenna configuration $N_0$ to receive the first U-BRRS 410, a second receive antenna configuration $N_1$ to receive a second U-BRRS 410, and so on. Based on the results of the different receive antenna configurations, the base station may select the second base station beam as the new active beam for communications with the UE.

Figure 5:
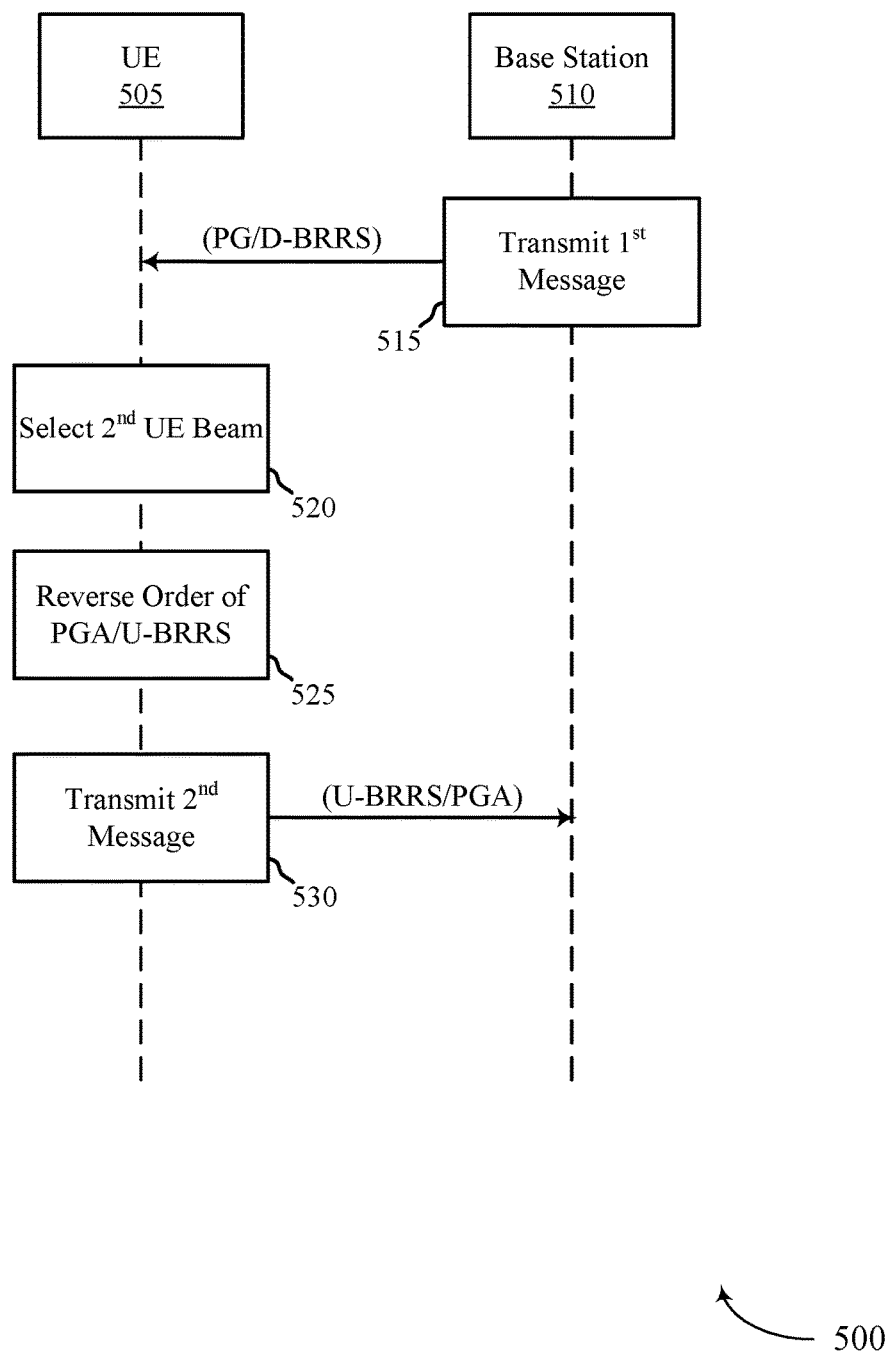
FIG. 5 illustrates an example of a process flow that supports beam refinement reference signal enhancement for higher mobility support in accordance with aspects of the present disclosure.

FIG. 5 illustrates an example of a process flow 500 for beam refinement reference signal enhancement for higher mobility support. Process flow 500 may implement aspects of wireless communication system 100 of FIG. 1. Process flow 500 may implement aspects of process flow 200, transmission scheme 300, and/or transmission scheme 400 of FIGS. 2 through 4. Process flow 500 may include a UE 505 and a base station 510, which may be examples of the corresponding devices described herein. Base station 510 may be a mmW base station and a serving base station for UE 505. Base station 510 and UE 505 may be communicating using an active beam, which may be referred to as beam N.

At 515, base station 510 may transmit the first message to UE 505. Base station 510 may use a first base station beam to transmit the first message. The first message may include a PG communication and a plurality of D-BRRSs. Generally, the first base station beam may be associated with a transmit and/or receive antenna configuration used for communication of the first message in a particular direction and having a beam width and/or beam shape. The first base station beam may have an associated width (e.g., beam width) that may be a function of the active beam. The first base station beam may be referred to as N'. The first base station beam may be considered a parent of the active beam and may cover the active beam, in some aspects. Thus, in the example where UE 505 has high mobility and moves out of the coverage area of the active beam, the first base station beam may still cover the UE 505.

In some aspects, the width of the first base station beam may be based on a mobility parameter of the UE 505, as discussed with reference to process flow 200. In some aspects, the base station 210 may transmit a first CR message in conjunction with transmission of the first message.

At 520, UE 505 may receive the first message from base station 510 using a first UE beam and use the plurality of D-BRRSs to select a second UE beam. Generally, the first UE beam may be associated with a transmit and/or receive antenna configuration used for communication of the first message in a particular direction and covering a particular beam width and/or beam shape. In some aspects, the UE 505 may use the first UE beam to receive the PG communication. UE 505 may then use a variety of different UE receive beam configurations to determine an updated active beam for the UE 505. For example, UE 505 may use different UE side receive antenna configurations to determine which D-BRRS is optimally received, e.g., received with the highest received power level, with the lowest interference level, with the highest supported throughput rate, and the like. This second UE beam may be considered the new active beam from the UE perspective and may be used for future transmissions and/or receptions.

At 525, the UE 505 may reverse the order of the PGA communication and the U-BRRS signals for the second message. For example, the UE 505 may configure the second message such that the U-BRRS signals precede in time the transmission of the PGA communication. In some aspects, the U-BRRSs may carry part of the PGA information, e.g., the U-BRRSs may include an indication that the PG is acknowledged.

At 530, UE 505 may use the second UE beam to transmit the second message to base station 510. The second message may include a PGA communication and a plurality of U-BRRSs, where the plurality of U-BRRSs may precede in time the PGA communication. In some aspects, UE 205 may transmit a CR message in conjunction with the second message.

In some aspects, the base station 510 may blindly detect the U-BRRSs using different receive antenna configurations. Based on the results of the received U-BRRSs, the base station 510 may select the second base station beam, as is discussed above. The base station 510 may then use the second base station beam to detect the PGA.

Figure 6:
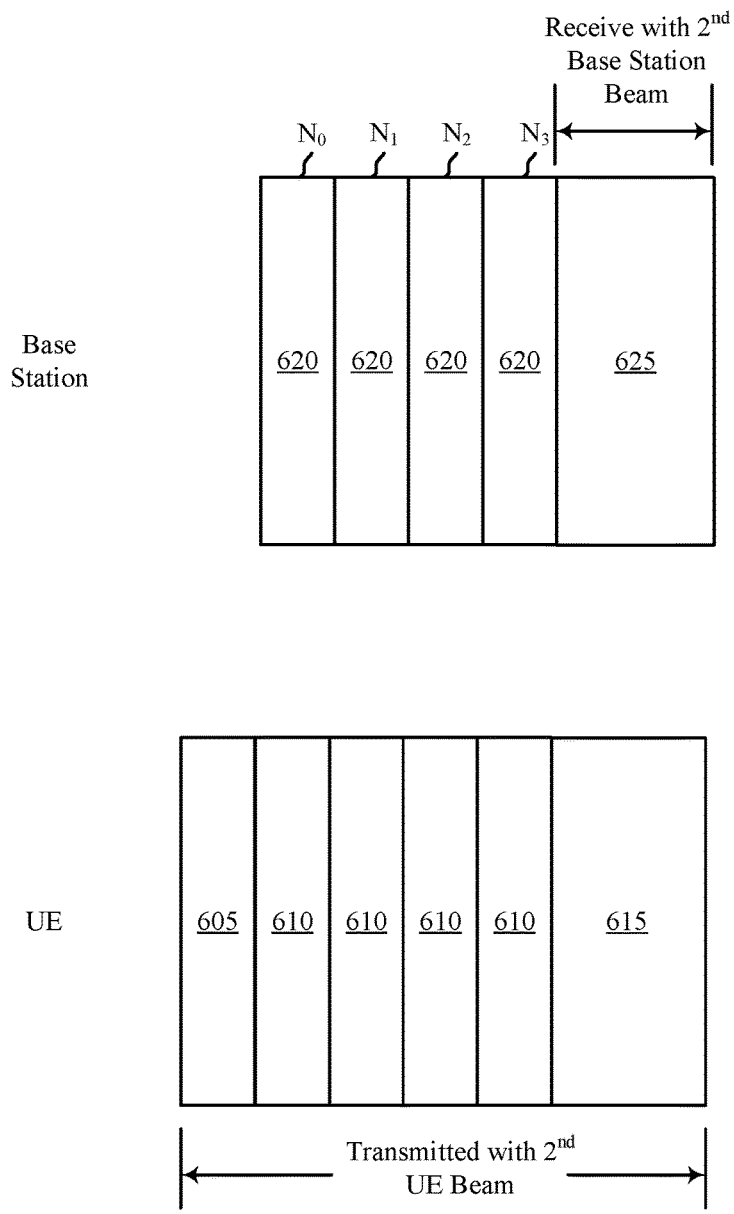
FIG. 6 illustrates an example of a beam refinement transmission scheme that supports beam refinement reference signal enhancement for higher mobility support in accordance with aspects of the present disclosure.

FIG. 6 illustrates an example of a beam refinement transmission scheme 600 for beam refinement reference signal enhancement for higher mobility support. Transmission scheme 600 may implement one or more aspects of wireless communication system 100 of FIG. 1. Transmission scheme 600 may implement one or more aspects of process flow 500 of FIG. 5. In some aspects, a base station and/or a UE may be configured to support aspects of transmission scheme 600. Transmission scheme 600 may be an example of an U-BRRS procedure performed between the UE and the base station.

Generally, transmission scheme 600 may include a UE transmitting a second message that includes a CR message 605, a plurality of U-BRRSs 610, and a PGA communication 615. The second message may be transmitted using the second UE beam, as discussed with reference to transmission scheme 300 of FIG. 3.

A base station may receive the second message using the first base station beam. For example, the base station may receive the plurality of U-BRRSs 610 using different antenna configurations 620. The first base station beam may be associated with a receive antenna configuration that has a wide beam width. This may also support receipt of the second message during a high mobility state of the UE. The base station may use a plurality of different receive antenna configurations 620 to receive the U-BRRSs 610. For example, the base station may use a first receive antenna configuration $N_0$ to receive the first U-BRRS 610, a second receive antenna configuration $N_1$ to receive a second U-BRRS 610, and so on. Based on the results of the different receive antenna configurations, the base station may select the second base station beam as the new active beam for communications with the UE. The base station may then use the second base station beam to receive the PGA communication 625.

Figure 7A:
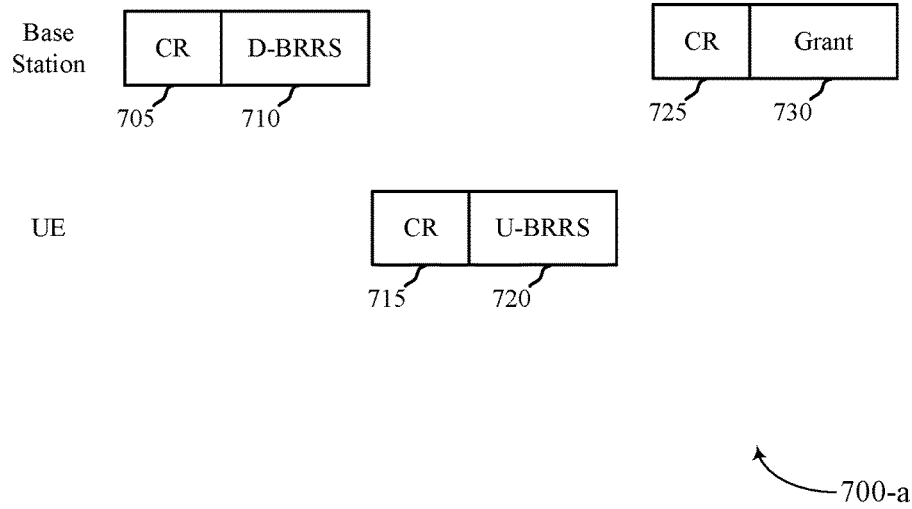
FIGS. 7A and 7B illustrate examples of a channel reservation transmission scheme that supports beam refinement reference signal enhancement for higher mobility support in accordance with aspects of the present disclosure.
Figure 7B:
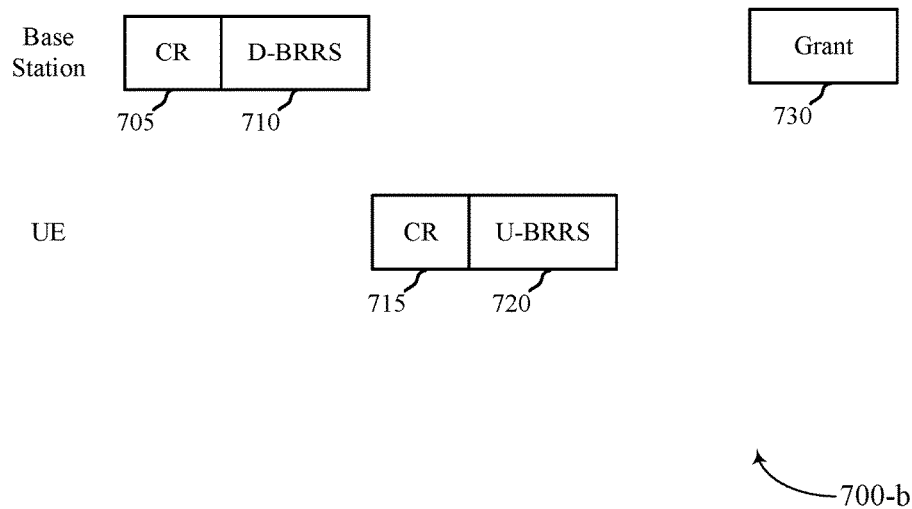

FIGS. 7A and 7B illustrate examples of a channel reservation transmission scheme 700 for beam refinement reference signal enhancement for higher mobility support. Transmission scheme 700 may implement one or more aspects of wireless communication system 100, process flows 200 and 500, and/or transmission schemes 300 and 400 of FIGS. 1 through 6. In some aspects, a base station and/or a UE may be configured to support aspects of transmission scheme 700. Transmission scheme 700 may support beam refinement reference signals using different CR message transmissions.

Generally, the described CR messages may be used to reserve the channel from other nodes (e.g., other UEs and/or base stations). In some aspects, the target node (e.g., the UE participating in the described BRRS enhancement techniques) may not need to receive the CR messages. However, in some aspects, the CR message may be configured to carry information to reduce the payload size of the PG and/or PGA communications.

Transmission scheme 700 may implement one or more considerations with respect to the CR message transmissions. For example and during the D-BRRS transmission, the base station may not yet know the second base station beam. Thus, if the CR message is transmitted using the current active beam, the CR message may reserve the channel in the wrong direction if the second base station beam is substantially different from the current active beam. Thus, in some aspects the base station may transmit the CR message using the first base station beam (e.g., the wide beam width) to reserve all potential directions. This may result in over reservation though and channel waste. One solution may be to send a second CR message at the beginning of the data burst using the second base station beam. On the UE side, however, the UE may know the second UE beam (e.g., the best beam to use) and may use this beam for transmission of the CR message.

Thus, transmission scheme 700 illustrates two examples for CR message transmission according to aspects of the described techniques. With reference to FIG. 7A, a first CR transmission scheme 700-*a* is illustrated that includes the base station transmitting a first CR message 705 prior to the D-BRRS 710 transmission. The first CR message 705 and D-BRRS 710 transmission may use the first base station beam (e.g., beam N'). The UE uses the D-BRRSs to select the second UE beam and then transmits a CR message 715 prior to the U-BRRS 720 transmission. The CR message 715 and the U-BRRS 720 transmissions may use the second UE beam. The base station uses the U-BRRS transmissions to select the second base station beam. The base station then uses the second base station beam to transmit a second CR message 725 prior to the grant 730 transmission.

In some aspects, the channel reservation time carried in the first and second CR messages 705 and 725 may use different approaches. In one approach, both CR messages may carry a channel reservation time until the end of the LBT frame, e.g., the first CR message 705 may over reserve the channel. In another approach, the first CR message 705 may carry a channel reservation time until the end of the U-BRRS 720 burst, while the second CR message 725 may carry a channel reservation time until the end of the LBT frame.

With reference to FIG. 7B, a second CR transmission scheme 700-*b* is illustrated that includes the base station transmitting a first CR message 705 prior to the D-BRRS 710 transmission. The first CR message 705 and D-BRRS 710 transmission may use the first base station beam (e.g., beam N'). The UE uses the D-BRRSs to select the second UE beam and then transmits a CR message 715 prior to the U-BRRS 720 transmission. The CR message 715 and the U-BRRS 720 transmissions may use the second UE beam. The base station uses the U-BRRS transmissions to select the second base station beam. The base station then uses the second base station beam to transmit the grant 730 transmission. Thus, in the transmission scheme 700-*b* the base station uses one CR message that may carry a channel reservation time until the end of the LBT frame.

Figure 8:
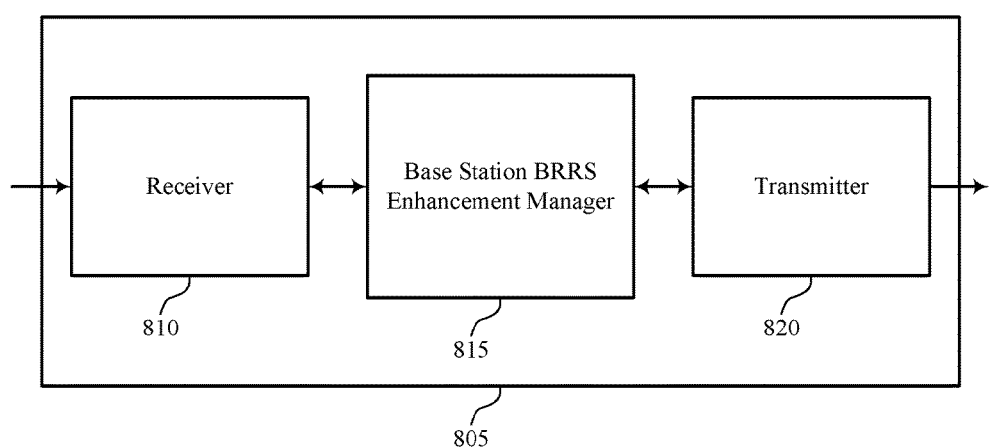
FIGS. 8 through 10 show block diagrams of a device that supports beam refinement reference signal enhancement for higher mobility support in accordance with aspects of the present disclosure.

FIG. 8 shows a block diagram 800 of a wireless device 805 that supports beam refinement reference signal enhancement for higher mobility support in accordance with various aspects of the present disclosure. Wireless device 805 may be an example of aspects of a base station 105 as described with reference to FIGS. 1 through 7B. Wireless device 805 may include a receiver 810, a base station BRRS enhancement manager 815, and a transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to beam refinement reference signal enhancement for higher mobility support, etc.). Information may be passed on to other components of the device. The receiver 810 may be an example of aspects of the transceiver 1135 described with reference to FIG. 11.

Base station BRRS enhancement manager 815 may be an example of aspects of the base station BRRS enhancement manager 1115 described with reference to FIG. 11.

Base station BRRS enhancement manager 815 may transmit, using a first base station beam, a first message to a UE, the first message including a pre-grant communication and a set of D-BRRSs. Base station BRRS enhancement manager 815 may receive a second message from the UE in response to the first message, the second message including a pre-grant acknowledgment and a set of U-BRRSs. Base station BRRS enhancement manager 815 may transmit, using a second base station beam, a third message to the UE, where a width of the second base station beam is less than a width of the first base station beam.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may include a single antenna, or it may include a set of antennas.

Figure 9:
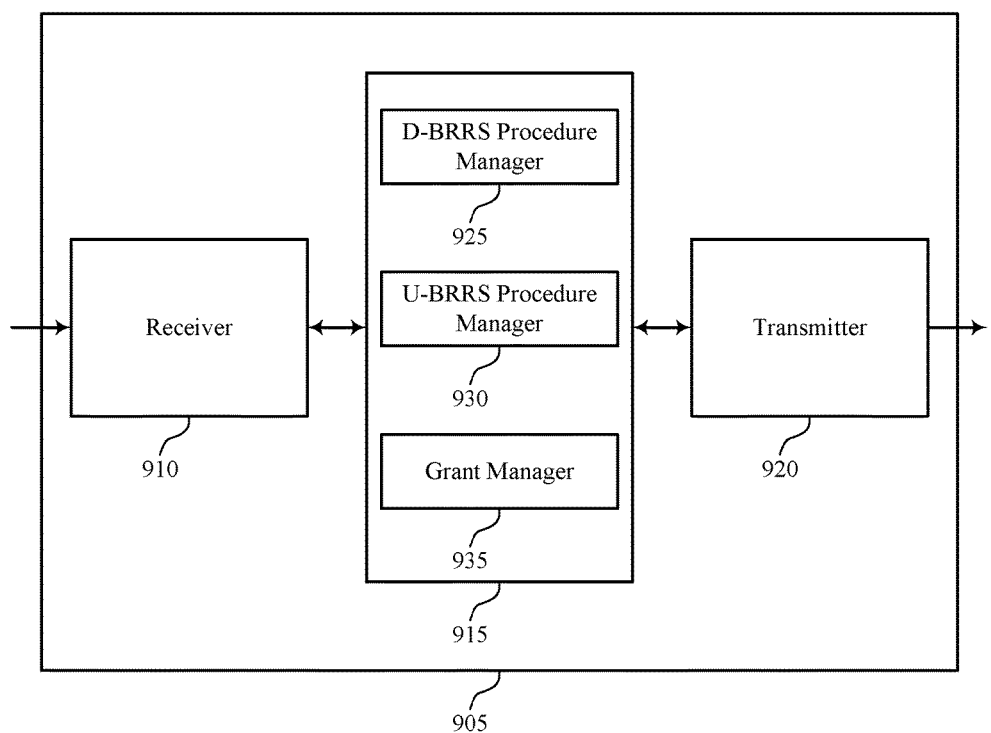

FIG. 9 shows a block diagram 900 of a wireless device 905 that supports beam refinement reference signal enhancement for higher mobility support in accordance with various aspects of the present disclosure. Wireless device 905 may be an example of aspects of a wireless device 805 or a base station 105 as described with reference to FIGS. 1 through 8. Wireless device 905 may include a receiver 910, a base station BRRS enhancement manager 915, and a transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to beam refinement reference signal enhancement for higher mobility support, etc.). Information may be passed on to other components of the device. The receiver 910 may be an example of aspects of the transceiver 1135 described with reference to FIG. 11.

Base station BRRS enhancement manager 915 may be an example of aspects of the base station BRRS enhancement manager 1115 described with reference to FIG. 11. Base station BRRS enhancement manager 915 may also include D-BRRS procedure manager 925, U-BRRS procedure manager 930, and grant manager 935.

D-BRRS procedure manager 925 may transmit, using a first base station beam, a first message to a UE, the first message including a pre-grant communication and a set of D-BRRSs.

U-BRRS procedure manager 930 may receive a second message from the UE in response to the first message, the second message including a pre-grant acknowledgment and a set of U-BRRSs. U-BRRS procedure manager 930 may select the second base station beam based on the set of U-BRRSs. In some cases, the set of U-BRRSs precede in time the pre-grant acknowledgement of the second message.

Grant manager 935 may transmit, using a second base station beam, a third message to the UE. A width of the second base station beam may be less than a width of the first base station beam. In some cases, the third message includes an uplink grant or a downlink grant.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may include a single antenna, or it may include a set of antennas.

Figure 10:
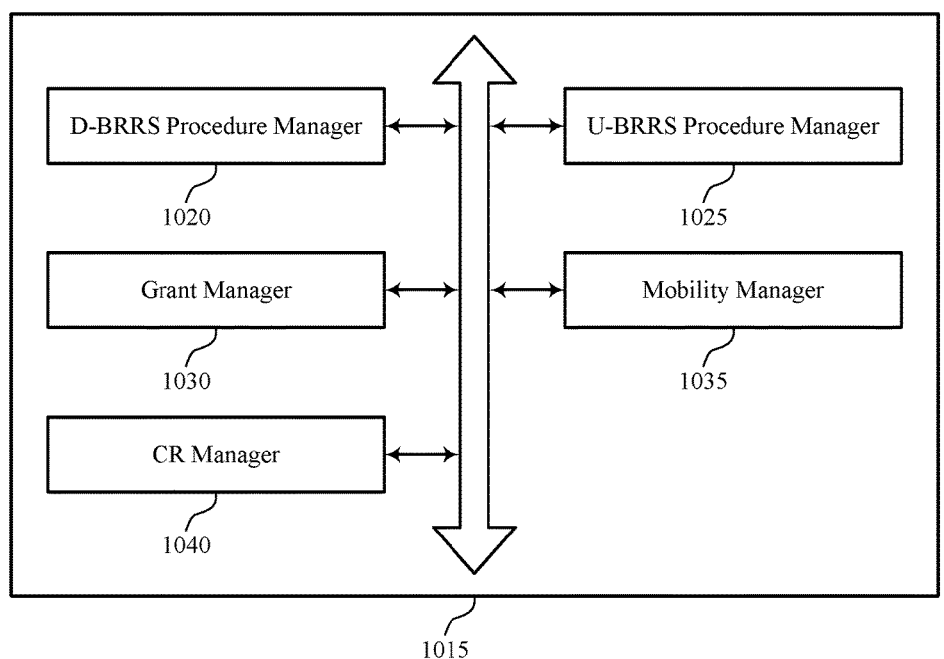

FIG. 10 shows a block diagram 1000 of a base station BRRS enhancement manager 1015 that supports beam refinement reference signal enhancement for higher mobility support in accordance with various aspects of the present disclosure. The base station BRRS enhancement manager 1015 may be an example of aspects of a base station BRRS enhancement manager 815, a base station BRRS enhancement manager 915, or a base station BRRS enhancement manager 1115 described with reference to FIGS. 8, 9, and 11. The base station BRRS enhancement manager 1015 may include a D-BRRS procedure manager 1020, a U-BRRS procedure manager 1025, a grant manager 1030, a mobility manager 1035, and a CR manager 1040. Each of these modules may communicate, directly or indirectly, with one another (e.g., via one or more buses).

D-BRRS procedure manager 1020 may transmit, using a first base station beam, a first message to a UE, the first message including a pre-grant communication and a set of D-BRRSs.

U-BRRS procedure manager 1025 may receive a second message from the UE in response to the first message, the second message including a pre-grant acknowledgment and a set of U-BRRSs. U-BRRS procedure manager 1025 may select the second base station beam based on the set of U-BRRSs. In some cases, the set of U-BRRSs precede in time the pre-grant acknowledgement of the second message.

Grant manager 1030 may transmit, using a second base station beam, a third message to the UE. A width of the second base station beam may be less than a width of the first base station beam. In some cases, the third message includes an uplink or a downlink grant.

Mobility manager 1035 may determine a mobility parameter associated with the UE, where the width of the first base station beam is based on the mobility parameter. In some cases, the mobility parameter includes one or more of a current mobility parameter, a historical mobility parameter, a speed parameter, a direction parameter, a location parameter, and a recent beamformed signal direction parameter.

CR manager 1040 may transmit a first CR message in conjunction with the first message using the first base station beam. CR manager 1040 may transmit a second CR message in conjunction with the third message using the second base station beam. In some cases, the first CR message and the second CR message reserve a channel of a shared radio frequency spectrum band for a same LBT frame. In some cases, the first CR message reserves a channel of a shared radio frequency spectrum band up to a time that the second CR message is transmitted, and where the second CR message reserves the channel until at least an end of the LBT frame.

Figure 11:
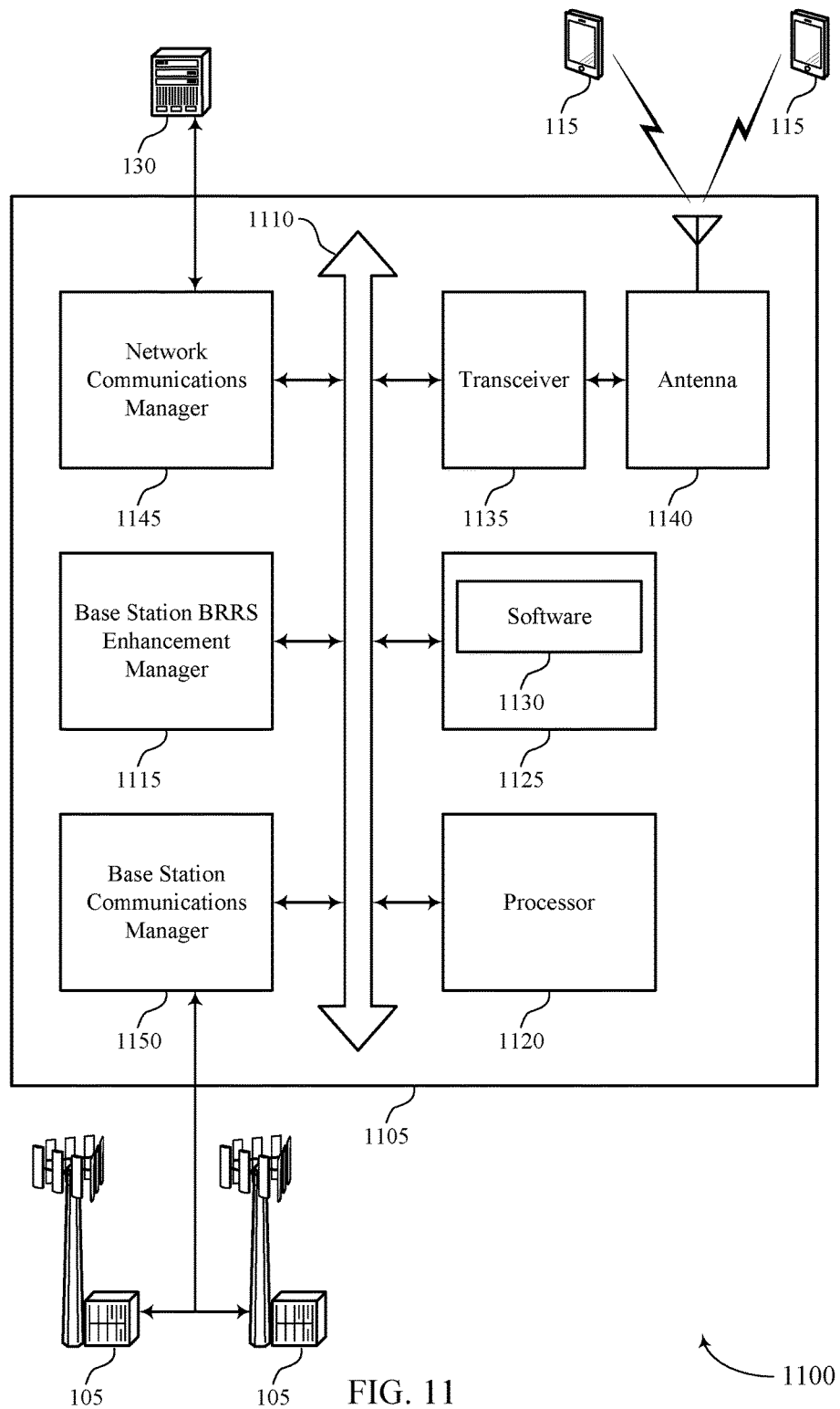
FIG. 11 illustrates a block diagram of a system including a base station that supports beam refinement reference signal enhancement for higher mobility support in accordance with aspects of the present disclosure.

FIG. 11 shows a diagram of a system 1100 including a device 1105 that supports beam refinement reference signal enhancement for higher mobility support in accordance with various aspects of the present disclosure. Device 1105 may be an example of or include the components of wireless device 805, wireless device 905, or a base station 105 as described above, e.g., with reference to FIGS. 1 through 9. Device 1105 may include components for bi-directional voice and data communications including components for transmitting and receiving communications, including a base station BRRS enhancement manager 1115, a processor 1120, a memory 1125, a software 1130, a transceiver 1135, an antenna 1140, a network communications manager 1145, and a base station communications manager 1150. These components may be in electronic communication via one or more busses (e.g., bus 1110). Device 1105 may communicate wirelessly with one or more UEs 115.

Processor 1120 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting beam refinement reference signal enhancement for higher mobility support).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware and/or software operation such as the interaction with peripheral components or devices.

Software 1130 may include code to implement aspects of the present disclosure, including code to support beam refinement reference signal enhancement for higher mobility support. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

Network communications manager 1145 may manage communications with the core network (e.g., via one or more wired backhaul links). For example, the network communications manager 1145 may manage the transfer of data communications for client devices, such as one or more UEs 115.

Base station communications manager 1150 may manage communications with other base station 105, and may include a controller or scheduler for controlling communications with UEs 115 in cooperation with other base stations 105. For example, the base station communications manager 1150 may coordinate scheduling for transmissions to UEs 115 for various interference mitigation techniques such as beamforming or joint transmission. In some examples, base station communications manager 1150 may provide an X2 interface within an LTE/LTE-A wireless communication network technology to provide communication between base stations 105.

Figure 12:
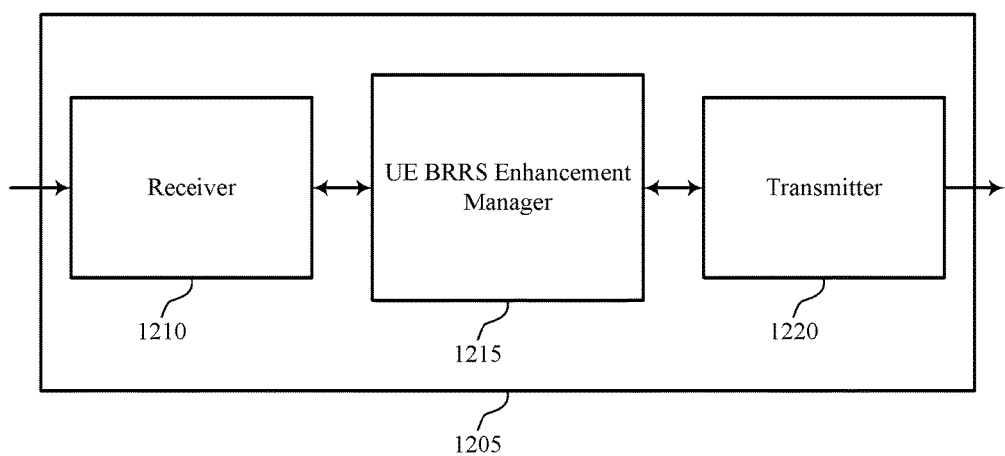
FIGS. 12 through 14 show block diagrams of a device that supports beam refinement reference signal enhancement for higher mobility support in accordance with aspects of the present disclosure.

FIG. 12 shows a block diagram 1200 of a wireless device 1205 that supports beam refinement reference signal enhancement for higher mobility support in accordance with various aspects of the present disclosure. Wireless device 1205 may be an example of aspects of a UE 115 as described with reference to FIGS. 1 through 7. Wireless device 1205 may include a receiver 1210, a UE BRRS enhancement manager 1215, and a transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to beam refinement reference signal enhancement for higher mobility support, etc.). Information may be passed on to other components of the device. The receiver 1210 may be an example of aspects of the transceiver 1535 described with reference to FIG. 15.

UE BRRS enhancement manager 1215 may be an example of aspects of the UE BRRS enhancement manager 1515 described with reference to FIG. 15.

UE BRRS enhancement manager 1215 may receive, using a first UE beam, a first message from a base station, the first message including a pre-grant communication and a set of D-BRRSs. UE BRRS enhancement manager 1215 may select a second UE beam based on the set of D-BRRSs. UE BRRS enhancement manager 1215 may transmit, using the second UE beam, a second message to the base station in response to the first message, the second message including a pre-grant acknowledgment and a set of U-BRRSs. UE BRRS enhancement manager 1215 may receive a third message from the base station using the second UE beam, where a width of the second UE beam is smaller than a width of the first UE beam.

The UE BRRS enhancement manager 1215 may also receive, using a first UE beam, a first message from a base station, the first message including a pre-grant communication and a set of D-BRRSs. UE BRRS enhancement manager 1215 may select a second UE beam based on the set of D-BRRSs. UE BRRS enhancement manager 1215 may transmit, using the second UE beam, a second message to the base station in response to the first message, the second message including a pre-grant acknowledgment and a set of U-BRRSs, where the set of U-BRRSs precede the pre-grant acknowledgment in time. UE BRRS enhancement manager 1215 may receive a third message from the base station using the second UE beam.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may include a single antenna, or it may include a set of antennas.

Figure 13:
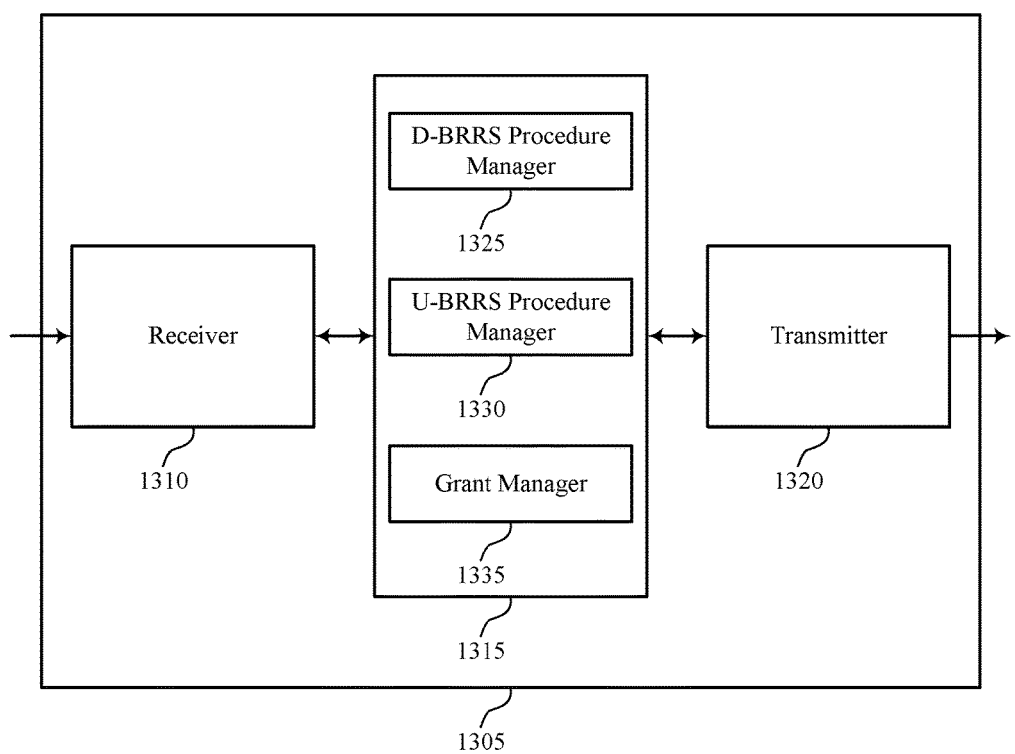

FIG. 13 shows a block diagram 1300 of a wireless device 1305 that supports beam refinement reference signal enhancement for higher mobility support in accordance with various aspects of the present disclosure. Wireless device 1305 may be an example of aspects of a wireless device 1205 or a UE 115 as described with reference to FIGS. 1 through 7B and 12. Wireless device 1305 may include a receiver 1310, a UE BRRS enhancement manager 1315, and a transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to beam refinement reference signal enhancement for higher mobility support, etc.). Information may be passed on to other components of the device. The receiver 1310 may be an example of aspects of the transceiver 1535 described with reference to FIG. 15.

UE BRRS enhancement manager 1315 may be an example of aspects of the UE BRRS enhancement manager 1515 described with reference to FIG. 15. UE BRRS enhancement manager 1315 may also include a D-BRRS procedure manager 1325, a U-BRRS procedure manager 1330, and a grant manager 1335.

D-BRRS procedure manager 1325 may receive, using a first UE beam, a first message from a base station, the first message including a pre-grant communication and a set of D-BRRSs. D-BRRS procedure manager 1325 may select a second UE beam based on the set of D-BRRSs. In some cases, a width of the second UE beam is smaller than a width of the first UE beam.

U-BRRS procedure manager 1330 may transmit, using the second UE beam, a second message to the base station in response to the first message, the second message including a pre-grant acknowledgment and a set of U-BRRSs. U-BRRS procedure manager 1330 may transmit, using the second UE beam, a second message to the base station in response to the first message, the second message including a pre-grant acknowledgment and a set of U-BRRSs, where the set of U-BRRSs precede the pre-grant acknowledgment in time.

Grant manager 1335 may receive a third message from the base station using the second UE beam. A width of the second UE beam is smaller than a width of the first UE beam. Grant manager 1335 may receive a third message from the base station using the second UE beam.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may include a single antenna, or it may include a set of antennas.

Figure 14:
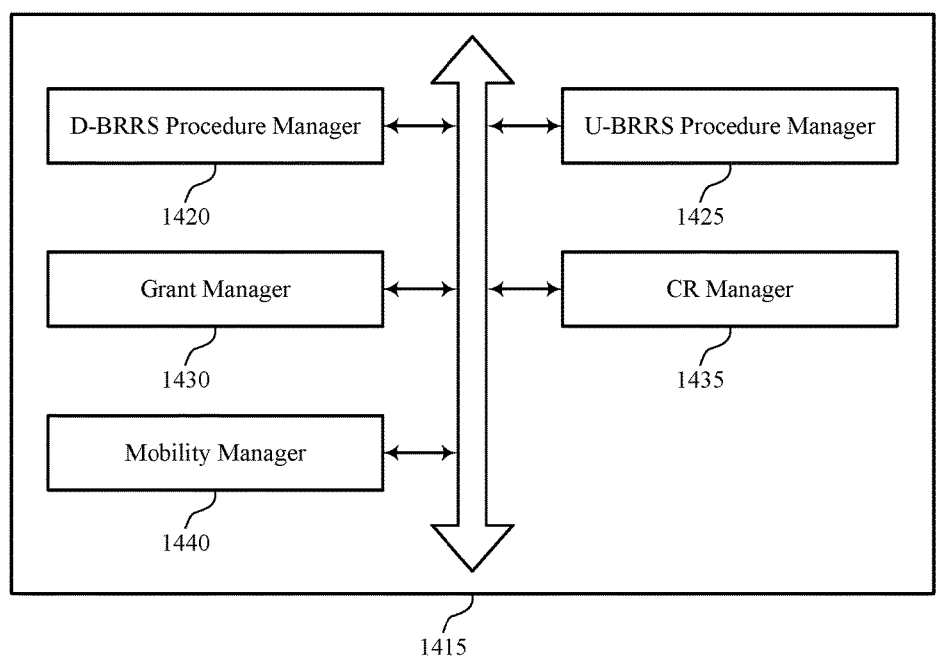

FIG. 14 shows a block diagram 1400 of a UE BRRS enhancement manager 1415 that supports beam refinement reference signal enhancement for higher mobility support in accordance with various aspects of the present disclosure. The UE BRRS enhancement manager 1415 may be an example of aspects of a UE BRRS enhancement manager 1215, 1315, and 1515 described with reference to FIGS. 12, 13, and 15. The UE BRRS enhancement manager 1415 may include a D-BRRS procedure manager 1420, a U-BRRS procedure manager 1425, a grant manager 1430, a CR manager 1435, and a mobility manager 1440. Each of these modules may communicate, directly or indirectly, with one another (e.g., via one or more buses).

D-BRRS procedure manager 1420 may receive, using a first UE beam, a first message from a base station, the first message including a pre-grant communication and a set of D-BRRSs. D-BRRS procedure manager 1420 may select a second UE beam based on the set of D-BRRSs. In some cases, a width of the second UE beam is smaller than a width of the first UE beam.

U-BRRS procedure manager 1425 may transmit, using the second UE beam, a second message to the base station in response to the first message, the second message including a pre-grant acknowledgment and a set of U-BRRSs. U-BRRS procedure manager 1425 may transmit, using the second UE beam, a second message to the base station in response to the first message, the second message including a pre-grant acknowledgment and a set of U-BRRSs, where the set of U-BRRSs precede the pre-grant acknowledgment in time. In some cases, the set of U-BRRSs precede in time the pre-grant acknowledgement.

Grant manager 1430 may receive a third message from the base station using the second UE beam. A width of the second UE beam is smaller than a width of the first UE beam. Grant manager 1430 may receive a third message from the base station using the second UE beam.

CR manager 1435 may transmit a CR message in conjunction with the second message using the first UE beam.

Mobility manager 1440 may determine a mobility parameter associated with the UE, where the width of the first UE beam is based on the mobility parameter. In some cases, the mobility parameter includes one or more of a current mobility parameter, a historical mobility parameter, a speed parameter, a direction parameter, a location parameter, and a recent beamformed signal direction parameter.

Figure 15:
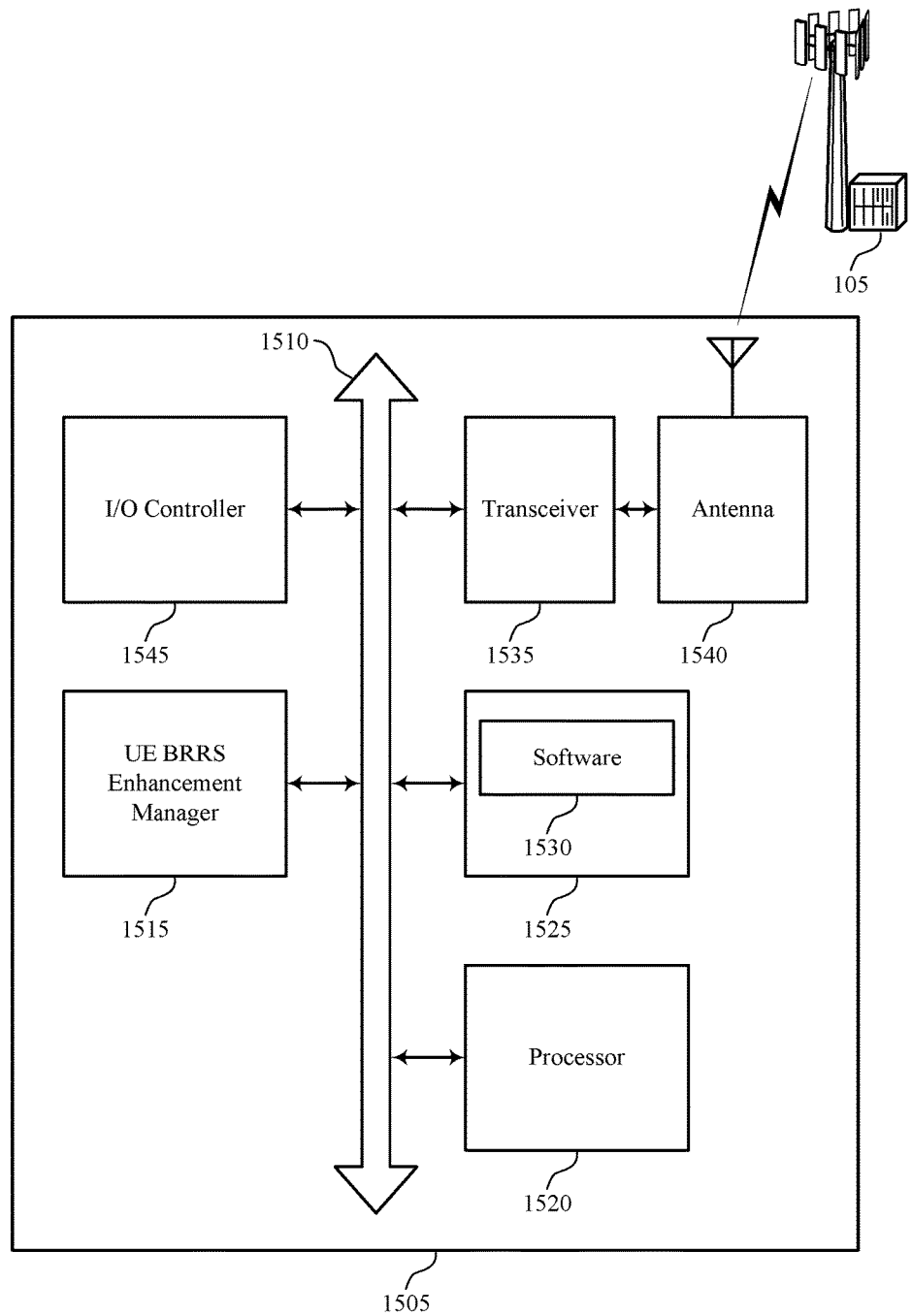
FIG. 15 illustrates a block diagram of a system including a user equipment that supports beam refinement reference signal enhancement for higher mobility support in accordance with aspects of the present disclosure.

FIG. 15 shows a diagram of a system 1500 including a device 1505 that supports beam refinement reference signal enhancement for higher mobility support in accordance with various aspects of the present disclosure. Device 1505 may be an example of or include the components of UE 115 as described above, e.g., with reference to FIGS. 1 through 7. Device 1505 may include components for bi-directional voice and data communications including components for transmitting and receiving communications, including a UE BRRS enhancement manager 1515, a processor 1520, a memory 1525, a software 1530, a transceiver 1535, an antenna 1540, and an I/O controller 1545. These components may be in electronic communication via one or more busses (e.g., bus 1510). Device 1505 may communicate wirelessly with one or more base stations 105.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting beam refinement reference signal enhancement for higher mobility support).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware and/or software operation such as the interaction with peripheral components or devices.

Software 1530 may include code to implement aspects of the present disclosure, including code to support beam refinement reference signal enhancement for higher mobility support. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

I/O controller 1545 may manage input and output signals for device 1505. I/O controller 1545 may also manage peripherals not integrated into device 1505. In some cases, I/O controller 1545 may represent a physical connection or port to an external peripheral. In some cases, I/O controller 1545 may utilize an operating system such as iOS®, ANDROID®, MS-DOS®, MS-WINDOWS®, OS/2®, UNIX®, LINUX®, or another known operating system.

Figure 16:
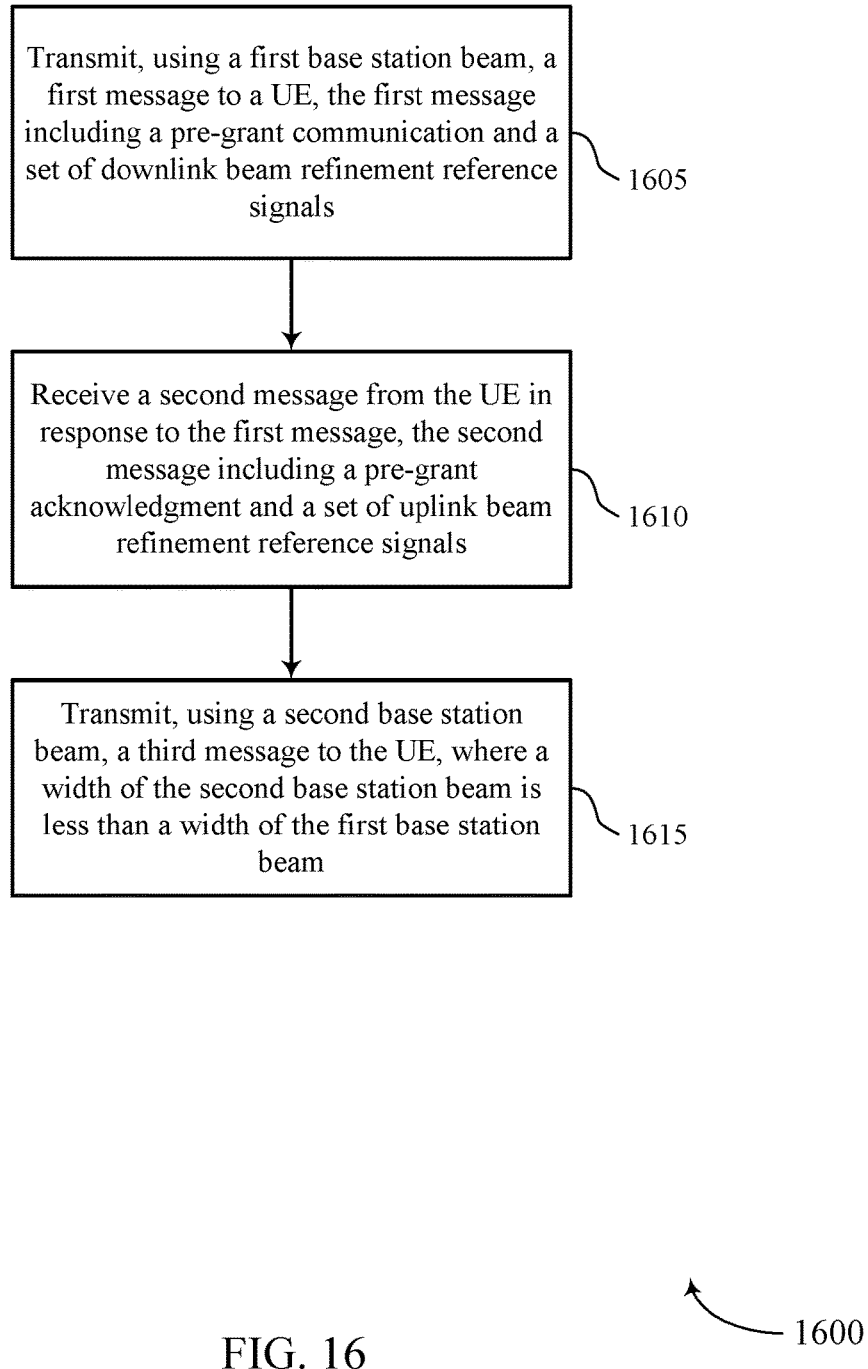
FIGS. 16 through 18 illustrate methods for beam refinement reference signal enhancement for higher mobility support in accordance with aspects of the present disclosure.

FIG. 16 shows a flowchart illustrating a method 1600 for beam refinement reference signal enhancement for higher mobility support in accordance with various aspects of the present disclosure. The operations of method 1600 may be implemented by a base station 105 or its components as described herein. For example, the operations of method 1600 may be performed by a base station BRRS enhancement manager as described with reference to FIGS. 8 through 11. In some examples, a base station 105 may execute a set of codes to control the functional elements of the device to perform the functions described below. Additionally or alternatively, the base station 105 may perform aspects the functions described below using special-purpose hardware.

At block 1605 the base station 105 may transmit, using a first base station beam, a first message to a UE, the first message comprising a pre-grant communication and a plurality of D-BRRSs. The operations of block 1605 may be performed according to the methods described with reference to FIGS. 1 through 7. In certain examples, aspects of the operations of block 1605 may be performed by a D-BRRS procedure manager as described with reference to FIGS. 8 through 11.

At block 1610 the base station 105 may receive a second message from the UE in response to the first message, the second message comprising a pre-grant acknowledgment and a plurality of U-BRRSs. The operations of block 1610 may be performed according to the methods described with reference to FIGS. 1 through 7. In certain examples, aspects of the operations of block 1610 may be performed by a U-BRRS procedure manager as described with reference to FIGS. 8 through 11.

At block 1615 the base station 105 may transmit, using a second base station beam, a third message to the UE, wherein a width of the second base station beam is less than a width of the first base station beam. The operations of block 1615 may be performed according to the methods described with reference to FIGS. 1 through 7. In certain examples, aspects of the operations of block 1615 may be performed by a grant manager as described with reference to FIGS. 8 through 11.

Figure 17:
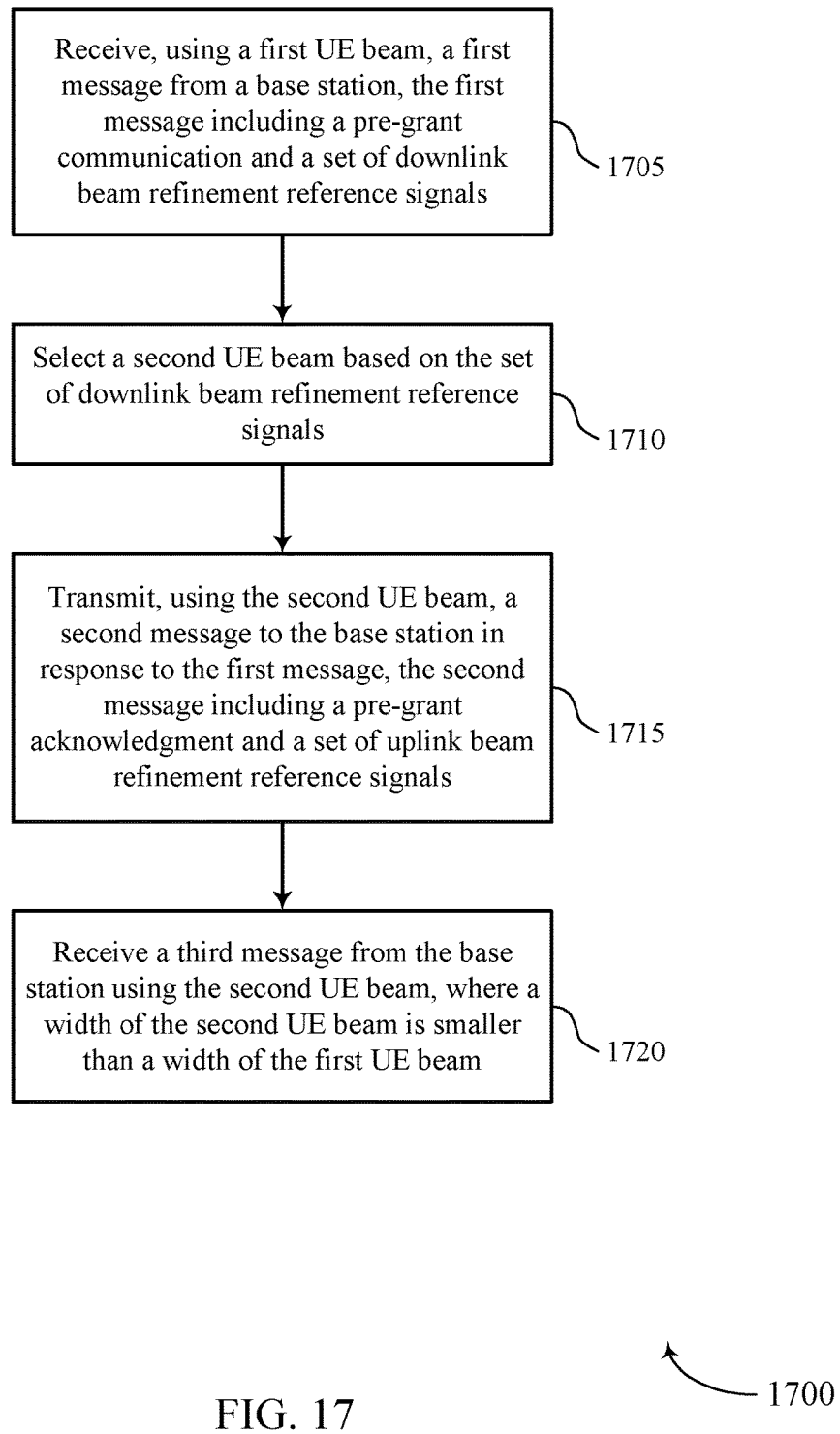

FIG. 17 shows a flowchart illustrating a method 1700 for beam refinement reference signal enhancement for higher mobility support in accordance with various aspects of the present disclosure. The operations of method 1700 may be implemented by a UE 115 or its components as described herein. For example, the operations of method 1700 may be performed by a UE BRRS enhancement manager as described with reference to FIGS. 12 through 15. In some examples, a UE 115 may execute a set of codes to control the functional elements of the device to perform the functions described below. Additionally or alternatively, the UE 115 may perform aspects the functions described below using special-purpose hardware.

At block 1705 the UE 115 may receive, using a first UE beam, a first message from a base station, the first message comprising a pre-grant communication and a plurality of D-BRRSs. The operations of block 1705 may be performed according to the methods described with reference to FIGS. 1 through 7. In certain examples, aspects of the operations of block 1705 may be performed by a D-BRRS procedure manager as described with reference to FIGS. 12 through 15.

At block 1710 the UE 115 may select a second UE beam based at least in part on the plurality of D-BRRSs. The operations of block 1710 may be performed according to the methods described with reference to FIGS. 1 through 7. In certain examples, aspects of the operations of block 1710 may be performed by a D-BRRS procedure manager as described with reference to FIGS. 12 through 15.

At block 1715 the UE 115 may transmit, using the second UE beam, a second message to the base station in response to the first message, the second message comprising a pre-grant acknowledgment and a plurality of U-BRRSs. The operations of block 1715 may be performed according to the methods described with reference to FIGS. 1 through 7. In certain examples, aspects of the operations of block 1715 may be performed by a U-BRRS procedure manager as described with reference to FIGS. 12 through 15.

At block 1720 the UE 115 may receive a third message from the base station using the second UE beam, wherein a width of the second UE beam is smaller than a width of the first UE beam. The operations of block 1720 may be performed according to the methods described with reference to FIGS. 1 through 7. In certain examples, aspects of the operations of block 1720 may be performed by a grant manager as described with reference to FIGS. 12 through 15.

Figure 18:
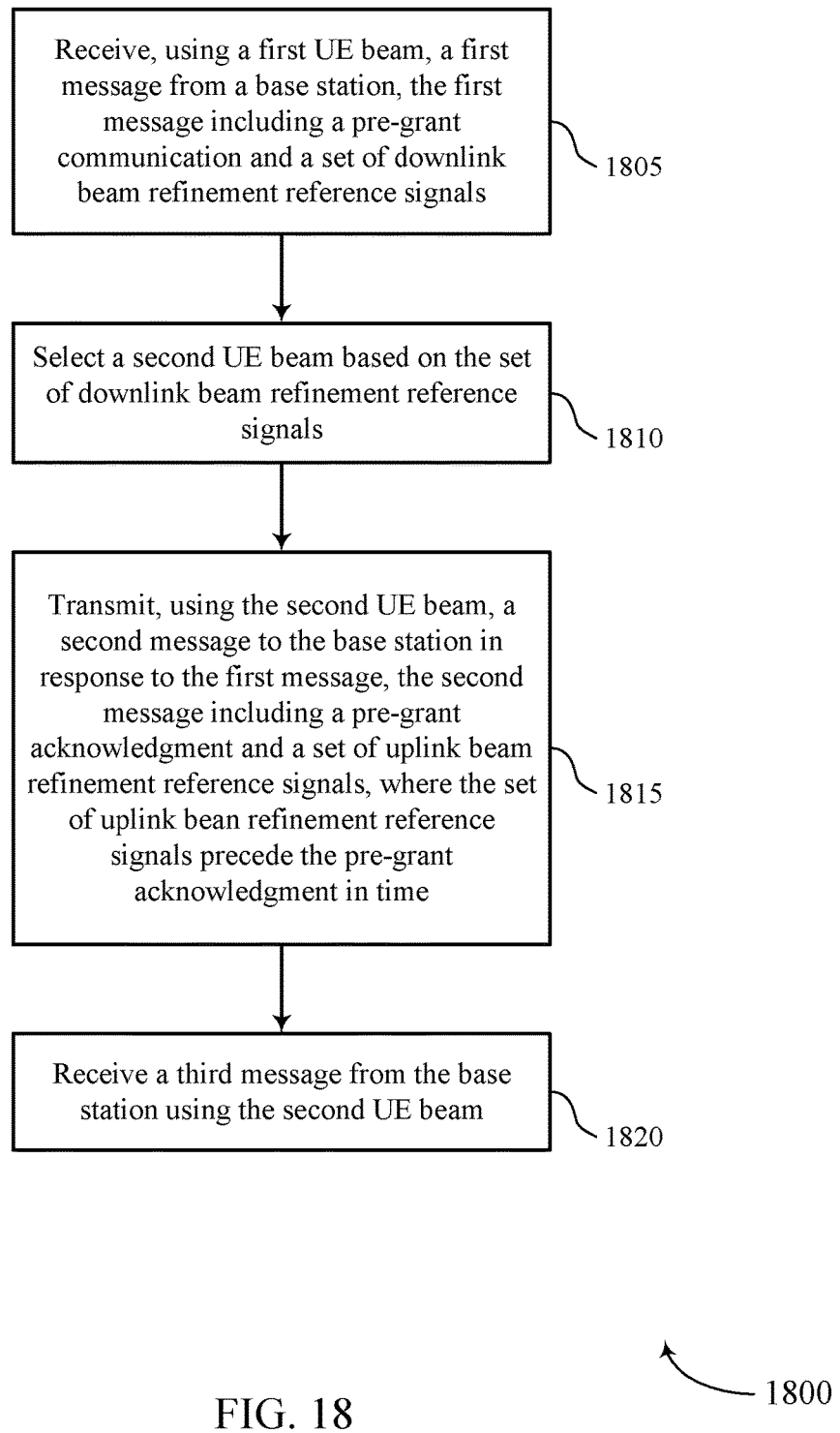

FIG. 18 shows a flowchart illustrating a method 1800 for beam refinement reference signal enhancement for higher mobility support in accordance with various aspects of the present disclosure. The operations of method 1800 may be implemented by a UE 115 or its components as described herein. For example, the operations of method 1800 may be performed by a UE BRRS enhancement manager as described with reference to FIGS. 12 through 15. In some examples, a UE 115 may execute a set of codes to control the functional elements of the device to perform the functions described below. Additionally or alternatively, the UE 115 may perform aspects the functions described below using special-purpose hardware.

At block 1805 the UE 115 may receive, using a first UE beam, a first message from a base station, the first message comprising a pre-grant communication and a plurality of D-BRRSs. The operations of block 1805 may be performed according to the methods described with reference to FIGS. 1 through 7. In certain examples, aspects of the operations of block 1805 may be performed by a D-BRRS procedure manager as described with reference to FIGS. 12 through 15.

At block 1810 the UE 115 may select a second UE beam based at least in part on the plurality of D-BRRSs. The operations of block 1810 may be performed according to the methods described with reference to FIGS. 1 through 7. In certain examples, aspects of the operations of block 1810 may be performed by a D-BRRS procedure manager as described with reference to FIGS. 12 through 15.

At block 1815 the UE 115 may transmit, using the second UE beam, a second message to the base station in response to the first message, the second message comprising a pre-grant acknowledgment and a plurality of U-BRRSs, wherein the plurality of U-BRRSs precede the pre-grant acknowledgment in time. The operations of block 1815 may be performed according to the methods described with reference to FIGS. 1 through 7. In certain examples, aspects of the operations of block 1815 may be performed by a U-BRRS procedure manager as described with reference to FIGS. 12 through 15.

At block 1820 the UE 115 may receive a third message from the base station using the second UE beam. The operations of block 1820 may be performed according to the methods described with reference to FIGS. 1 through 7. In certain examples, aspects of the operations of block 1820 may be performed by a grant manager as described with reference to FIGS. 12 through 15.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
transmitting, using a first base station beam, a first message to a user equipment (UE), the first message comprising a pre-grant communication and a plurality of downlink beam refinement reference signals;
receiving a second message from the UE in response to the first message, the second message comprising a pre-grant acknowledgment and a plurality of uplink beam refinement reference signals;
selecting a second base station beam based at least in part on the plurality of uplink beam refinement reference signals; and
transmitting, using the second base station beam, a third message to the UE, wherein a width of the second base station beam is less than a width of the first base station beam.

2. The method of claim 1, further comprising:
determining a mobility parameter associated with the UE, wherein the width of the first base station beam is based at least in part on the mobility parameter.

3. The method of claim 2, wherein:
the mobility parameter comprises one or more of a current mobility parameter, a historical mobility parameter, a speed parameter, a direction parameter, a location parameter, and a recent beamformed signal direction parameter.

4. The method of claim 1, wherein:
the plurality of uplink beam refinement reference signals precede in time the pre-grant acknowledgement of the second message.

5. The method of claim 1, further comprising:
transmitting a first channel reservation message in conjunction with the first message using the first base station beam.

6. The method of claim 5, further comprising:
transmitting a second channel reservation message in conjunction with the third message using the second base station beam.

7. The method of claim 6, wherein:
the first channel reservation message and the second channel reservation message reserve a channel of a shared radio frequency spectrum band for a same listen-before-talk (LBT) frame.

8. The method of claim 6, wherein:
the first channel reservation message reserves a channel of a shared radio frequency spectrum band up to a time that the second channel reservation message is transmitted, and wherein the second channel reservation message reserves the channel until at least an end of the listen-before-talk (LBT) frame.

9. The method of claim 1, wherein:
the third message comprises an uplink or a downlink grant.

10. A method for wireless communication, comprising:
receiving, using a first user equipment (UE) beam, a first message from a base station, the first message comprising a pre-grant communication and a plurality of downlink beam refinement reference signals;
selecting a second UE beam based at least in part on the plurality of downlink beam refinement reference signals;
transmitting, using the second UE beam, a second message to the base station in response to the first message, the second message comprising a pre-grant acknowledgment and a plurality of uplink beam refinement reference signals; and
receiving a third message from the base station using the second UE beam, wherein a width of the second UE beam is smaller than a width of the first UE beam.

11. The method of claim 10, wherein:
the plurality of uplink beam refinement reference signals precede in time the pre-grant acknowledgement.

12. The method of claim 10, further comprising:
transmitting a channel reservation message in conjunction with the second message using the first UE beam.

13. The method of claim 10, further comprising:
determining a mobility parameter associated with the UE, wherein the width of the first UE beam is based at least in part on the mobility parameter.

14. The method of claim 13, wherein:
the mobility parameter comprises one or more of a current mobility parameter, a historical mobility parameter, a speed parameter, a direction parameter, a location parameter, and a recent beamformed signal direction parameter.

15. A method for wireless communication, comprising:
receiving, using a first user equipment (UE) beam, a first message from a base station, the first message comprising a pre-grant communication and a plurality of downlink beam refinement reference signals;
selecting a second UE beam based at least in part on the plurality of downlink beam refinement reference signals, wherein a width of the second UE beam is smaller than a width of the first UE beam;
transmitting, using the second UE beam, a second message to the base station in response to the first message, the second message comprising a pre-grant acknowledgment and a plurality of uplink beam refinement reference signals, wherein the plurality of uplink beam refinement reference signals precede the pre-grant acknowledgment in time; and
receiving a third message from the base station using the second UE beam.

16. The method of claim 15, further comprising:
transmitting a channel reservation message in conjunction with the second message using the second UE beam.

17. The method of claim 15, further comprising:
determining a mobility parameter associated with the UE, wherein the width of the first UE beam is based at least in part on the mobility parameter.

18. The method of claim 17, wherein:
the mobility parameter comprises one or more of a current mobility parameter, a historical mobility parameter, a speed parameter, a direction parameter, a location parameter, and a recent beamformed signal direction parameter.

19. An apparatus for wireless communication, in a system comprising:
a processor;
memory in electronic communication with the processor; and
instructions stored in the memory and operable, when executed by the processor, to cause the apparatus to:
transmit, using a first base station beam, a first message to a user equipment (UE), the first message comprising a pre-grant communication and a plurality of downlink beam refinement reference signals;
receive a second message from the UE in response to the first message, the second message comprising a pre-grant acknowledgment and a plurality of uplink beam refinement reference signals;
select a second base station beam based at least in part on the plurality of uplink beam refinement reference signals; and
transmit, using the second base station beam, a third message to the UE, wherein a width of the second base station beam is less than a width of the first base station beam.

20. The apparatus of claim 19, wherein the instructions are further executable by the processor to:
determine a mobility parameter associated with the UE, wherein the width of the first base station beam is based at least in part on the mobility parameter.

21. The apparatus of claim 20, wherein:
the mobility parameter comprises one or more of a current mobility parameter, a historical mobility parameter, a speed parameter, a direction parameter, a location parameter, and a recent beamformed signal direction parameter.

22. The apparatus of claim 19, wherein:
the plurality of uplink beam refinement reference signals precede in time the pre-grant acknowledgement of the second message.

23. The apparatus of claim 19, wherein the instructions are further executable by the processor to:
transmit a first channel reservation message in conjunction with the first message using the first base station beam.

24. The apparatus of claim 23, wherein the instructions are further executable by the processor to:
transmit a second channel reservation message in conjunction with the third message using the second base station beam.

25. The apparatus of claim 24, wherein:
the first channel reservation message and the second channel reservation message reserve a channel of a shared radio frequency spectrum band for a same listen-before-talk (LBT) frame.

26. The apparatus of claim 24, wherein:
the first channel reservation message reserves a channel of a shared radio frequency spectrum band up to a time that the second channel reservation message is transmitted, and wherein the second channel reservation message reserves the channel until at least an end of the listen-before-talk (LBT) frame.

27. The apparatus of claim 19, wherein:
the third message comprises an uplink or a downlink grant.

* * * * *